(12) United States Patent
Sheridon

(10) Patent No.: US 6,690,350 B2
(45) Date of Patent: Feb. 10, 2004

(54) ROTATING ELEMENT SHEET MATERIAL WITH DUAL VECTOR FIELD ADDRESSING

(75) Inventor: Nicholas K. Sheridon, Los Altos, CA (US)

(73) Assignee: Xerox Corporation, Stamford, CT (US)

(*) Notice: Subject to any disclaimer, the term of this patent is extended or adjusted under 35 U.S.C. 154(b) by 84 days.

(21) Appl. No.: 09/757,539

(22) Filed: Jan. 11, 2001

(65) Prior Publication Data

US 2002/0089486 A1 Jul. 11, 2002

(51) Int. Cl.⁷ .................................................. G09G 3/34
(52) U.S. Cl. ......................... 345/107; 348/84; 348/85
(58) Field of Search .......................... 345/85, 107, 84, 345/86; 359/296

(56) References Cited

U.S. PATENT DOCUMENTS

| | | | |
|---|---|---|---|
| 2,326,634 A | 8/1943 | Gebhard et al. ............... 88/82 |
| 2,354,018 A | 7/1944 | Heltzer et al. ................. 88/82 |
| 2,354,048 A | 7/1944 | Palmquist ..................... 40/135 |
| 2,354,049 A | 7/1944 | Palmquist ..................... 40/135 |
| 2,407,680 A | 9/1946 | Palmquist et al. ............. 88/82 |
| 2,600,963 A | 6/1952 | Bland ............................ 49/58 |
| 2,684,788 A | 7/1954 | Bland ......................... 222/177 |
| 2,794,301 A | 6/1957 | Law et al. ..................... 49/84 |
| 2,950,985 A | 8/1960 | d'Adrian ..................... 117/33 |
| 2,965,921 A | 12/1960 | Bland ............................ 18/2.5 |
| 2,980,547 A | 4/1961 | d'Adrian ..................... 106/47 |
| 3,034,177 A | 5/1962 | Hooper ......................... 18/40 |
| 3,036,388 A | 5/1962 | Tate .............................. 35/66 |
| 3,063,388 A | 11/1962 | Magarian et al. ........... 105/376 |
| RE25,363 E | 4/1963 | Tate .............................. 35/66 |
| 3,150,947 A | 9/1964 | Bland ............................ 65/21 |
| 3,222,204 A | 12/1965 | Weber et al. ................. 117/27 |
| 3,243,273 A | 3/1966 | Bland ............................ 65/21 |
| 3,310,391 A | 3/1967 | Law ............................... 65/21 |
| 3,406,363 A | 10/1968 | Tate ............................ 335/302 |
| 3,594,065 A | 7/1971 | Marks ........................ 350/160 |
| 3,615,993 A | 10/1971 | French ....................... 156/155 |
| 3,617,333 A | 11/1971 | Brown ......................... 117/35 |
| 3,648,281 A | 3/1972 | Dahms et al. .............. 340/373 |
| 3,795,435 A | 3/1974 | Schwab ...................... 350/105 |
| 3,915,771 A | 10/1975 | Gatzke et al. ................. 156/71 |
| 3,982,334 A | 9/1976 | Tate .............................. 35/66 |
| 4,001,140 A | 1/1977 | Foris et al. .................. 252/316 |
| 4,002,022 A | 1/1977 | Lopez C. ..................... 58/126 |

(List continued on next page.)

FOREIGN PATENT DOCUMENTS

| | | |
|---|---|---|
| WO | WO 98/03896 | 1/1998 |
| WO | WO 98/41899 | 9/1998 |
| WO | WO 99/10767 | 3/1999 |

OTHER PUBLICATIONS

Comiskey et al., "Electrophoretic Ink: A printable Display Material," SID 97 Digest, pp. 75–76 (1997).

(List continued on next page.)

*Primary Examiner*—Steven Saras
*Assistant Examiner*—Fritz Alphonse
(74) *Attorney, Agent, or Firm*—Finnegan, Henderson, Farabow, Garrett & Dunner, L.L.P.

(57) ABSTRACT

Rotating element sheet material comprising a plurality of rotatable elements disposed in a substrate and in contact with an enabling fluid; where one of the plurality of rotatable elements comprises a core configured to present a first aspect in a first orientation and a second aspect in a second orientation, and where the first orientation and the second orientation are related by a rotational transformation about an axis of the rotatable element, and where the rotatable element in contact with the enabling fluid is further configured to exhibit a first addressing dipole configured to couple with a first vector field and a second addressing dipole configured to couple with a second vector field, and where the rotatable element exhibits the first aspect in the first vector field in a first direction and the second aspect in the second vector field in the first direction.

18 Claims, 31 Drawing Sheets

U.S. PATENT DOCUMENTS

| | | | |
|---|---|---|---|
| 4,082,426 A | 4/1978 | Brown | 350/105 |
| RE29,742 E | 8/1978 | Tung | 2/412 |
| 4,117,192 A | 9/1978 | Jorgensen | 428/337 |
| 4,117,194 A | 9/1978 | Barbe et al. | 428/374 |
| 4,126,854 A | 11/1978 | Sheridon | 340/373 |
| 4,143,103 A | 3/1979 | Sheridon | 264/4 |
| 4,143,472 A | 3/1979 | Murata et al. | 35/66 |
| 4,229,732 A | 10/1980 | Hartstein et al. | 340/378.2 |
| 4,232,084 A | 11/1980 | Tate | 428/309 |
| 4,253,909 A | 3/1981 | Lee | 156/654 |
| 4,256,677 A | 3/1981 | Lee | 264/8 |
| 4,261,653 A | 4/1981 | Goodrich | 350/362 |
| 4,267,946 A | 5/1981 | Thatcher | 222/345 |
| 4,268,413 A | 5/1981 | Dabisch | 252/408 |
| 4,273,672 A | 6/1981 | Vassiliades | 252/316 |
| 4,283,438 A | 8/1981 | Lee | 427/47 |
| 4,288,788 A | 9/1981 | Rogers et al. | 340/378.2 |
| 4,299,880 A | 11/1981 | Arens | 428/304 |
| 4,367,920 A | 1/1983 | Tung et al. | 350/105 |
| 4,368,952 A | 1/1983 | Murata et al. | 350/362 |
| 4,374,889 A | 2/1983 | Arens | 428/202 |
| 4,381,616 A | 5/1983 | Saxer | 40/502 |
| 4,402,062 A | 8/1983 | Batchelder | 365/153 |
| 4,411,973 A | 10/1983 | Gilmour et al. | 430/7 |
| 4,417,543 A | 11/1983 | Lee | 118/620 |
| 4,418,098 A | 11/1983 | Maistrovich | 427/161 |
| 4,418,346 A | 11/1983 | Batchelder | 340/787 |
| 4,419,383 A | 12/1983 | Lee | 427/47 |
| 4,438,160 A | 3/1984 | Ishikawa et al. | 427/214 |
| 4,441,791 A | 4/1984 | Hornbeck | 350/360 |
| 4,457,723 A | 7/1984 | Tate | 434/409 |
| 4,492,435 A | 1/1985 | Banton et al. | 350/360 |
| 4,500,172 A | 2/1985 | Gagnon et al. | 350/331 R |
| 4,511,210 A | 4/1985 | Tung et al. | 350/105 |
| 4,532,608 A | 7/1985 | Wu | 365/127 |
| 4,569,857 A | 2/1986 | Tung et al. | 427/163 |
| 4,592,628 A | 6/1986 | Altman et al. | 350/486 |
| 4,627,689 A | 12/1986 | Asher | 350/362 |
| 4,632,517 A | 12/1986 | Asher | 350/362 |
| 4,657,349 A * | 4/1987 | Labes et al. | 359/296 |
| 4,675,476 A | 6/1987 | Kobayashi | 178/18 |
| 4,678,695 A | 7/1987 | Tung et al. | 428/120 |
| 4,688,900 A | 8/1987 | Doane et al. | 350/347 |
| 4,695,528 A | 9/1987 | Dabisch et al. | 430/290 |
| 4,701,024 A | 10/1987 | Kobayashi et al. | 350/331 |
| 4,710,732 A | 12/1987 | Hornbeck | 332/7.51 |
| 4,713,295 A | 12/1987 | Laroche | 428/406 |
| 4,721,649 A | 1/1988 | Belisle et al. | 428/325 |
| 4,725,494 A | 2/1988 | Belisle et al. | 428/325 |
| 4,729,687 A | 3/1988 | Arens | 401/198 |
| 4,740,266 A | 4/1988 | Wu | 156/633 |
| 4,781,789 A | 11/1988 | Wu | 156/633 |
| 4,781,790 A | 11/1988 | Wu | 156/633 |
| 4,783,236 A | 11/1988 | Wu | 156/633 |
| 4,795,243 A | 1/1989 | Suzuki | 350/362 |
| 4,795,528 A | 1/1989 | Wu | 156/633 |
| 4,810,431 A | 3/1989 | Leidner | 264/15 |
| 4,837,071 A | 6/1989 | Tagoku et al. | 428/195 |
| 4,877,253 A | 10/1989 | Arens | 273/240 |
| 4,890,902 A | 1/1990 | Doane et al. | 350/347 |
| 4,919,521 A * | 4/1990 | Tada et al. | 359/296 |
| 4,931,019 A | 6/1990 | Park | 434/409 |
| 4,948,232 A | 8/1990 | Lange | 350/334 |
| 4,956,619 A | 9/1990 | Hornbeck | 330/4.3 |
| 4,991,941 A | 2/1991 | Kalmanash | 350/347 |
| 4,994,204 A | 2/1991 | Doane et al. | 252/299.01 |
| 5,006,422 A | 4/1991 | Sakurai et al. | 428/694 |
| 5,039,557 A | 8/1991 | White | 427/137 |
| 5,066,559 A | 11/1991 | Elmasry et al. | 430/111 |
| 5,075,186 A | 12/1991 | Sheridon | 430/47 |
| 5,128,203 A | 7/1992 | LaRoche | 428/325 |
| 5,131,736 A | 7/1992 | Alvarez | 359/886 |
| 5,151,032 A | 9/1992 | Igawa | 434/409 |
| 5,155,607 A | 10/1992 | Inoue et al. | 359/51 |
| 5,157,011 A | 10/1992 | Okabe et al. | 503/201 |
| 5,189,658 A | 2/1993 | Moses | 369/100 |
| 5,219,820 A | 6/1993 | Morohoshi et al. | 503/204 |
| 5,223,473 A | 6/1993 | Oliver et al. | 503/226 |
| 5,226,099 A | 7/1993 | Mignardi et al. | 385/19 |
| 5,233,459 A | 8/1993 | Bozler et al. | 359/230 |
| 5,249,000 A | 9/1993 | Okabe et al. | 346/151 |
| 5,251,048 A | 10/1993 | Doane et al. | 359/51 |
| 5,262,098 A | 11/1993 | Crowley et al. | 264/8 |
| 5,262,374 A | 11/1993 | Okabe et al. | 503/201 |
| 5,270,872 A | 12/1993 | Spry | 359/885 |
| 5,274,460 A | 12/1993 | Yamada et al. | 358/296 |
| 5,290,066 A | 3/1994 | Mody | 281/15.1 |
| 5,315,418 A | 5/1994 | Sprague et al. | 359/41 |
| 5,315,776 A | 5/1994 | Strawbridge et al. | 40/505 |
| 5,331,454 A | 7/1994 | Hornbeck | 359/224 |
| 5,344,594 A | 9/1994 | Sheridon | 264/4.1 |
| 5,351,995 A | 10/1994 | Booker | 283/117 |
| 5,354,598 A | 10/1994 | Arens | 428/195 |
| 5,363,222 A | 11/1994 | Ledebuhr | 359/40 |
| 5,383,008 A | 1/1995 | Sheridon | 355/256 |
| 5,384,067 A | 1/1995 | Doane et al. | 252/299.01 |
| 5,389,426 A | 2/1995 | Arens et al. | 428/195 |
| 5,389,945 A | 2/1995 | Sheridon | 345/85 |
| 5,397,503 A | 3/1995 | Yuasa et al. | 252/299.01 |
| 5,411,398 A | 5/1995 | Nakanishi et al. | 434/409 |
| 5,416,996 A | 5/1995 | Clemens et al. | 40/502 |
| 5,432,526 A | 7/1995 | Hyatt | 345/87 |
| 5,432,534 A | 7/1995 | Maruyama et al. | 347/172 |
| 5,459,602 A | 10/1995 | Sampsell | 359/234 |
| 5,469,020 A | 11/1995 | Herrick | 313/511 |
| 5,475,401 A | 12/1995 | Verrier et al. | 345/179 |
| 5,515,075 A | 5/1996 | Nakagiri et al. | 345/111 |
| 5,526,016 A | 6/1996 | Nakagiri et al. | 345/111 |
| 5,535,047 A | 7/1996 | Hornbeck | 359/295 |
| 5,582,700 A | 12/1996 | Bryning et al. | 204/450 |
| 5,604,027 A | 2/1997 | Sheridon | 428/323 |
| 5,627,562 A | 5/1997 | Skodlar | 345/111 |
| 5,659,330 A | 8/1997 | Sheridon | 345/84 |
| 5,667,924 A | 9/1997 | Ziolo | 430/39 |
| 5,703,671 A | 12/1997 | Narita et al. | 355/32 |
| 5,708,525 A | 1/1998 | Sheridon | 359/296 |
| 5,717,283 A | 2/1998 | Biegelsen et al. | 313/483 |
| 5,717,514 A * | 2/1998 | Sheridon | 359/296 |
| 5,717,515 A | 2/1998 | Sheridon | 359/296 |
| 5,723,204 A | 3/1998 | Stefik | 428/206 |
| 5,724,064 A | 3/1998 | Stefik et al. | 345/105 |
| 5,731,792 A | 3/1998 | Sheridon | 345/84 |
| 5,737,115 A | 4/1998 | Mackinlay et al. | 359/296 |
| 5,739,801 A | 4/1998 | Sheridon | 345/84 |
| 5,739,946 A | 4/1998 | Iwanaga et al. | 359/296 |
| 5,751,268 A | 5/1998 | Sheridon | 345/107 |
| 5,754,332 A | 5/1998 | Crowley | 359/296 |
| 5,757,345 A | 5/1998 | Sheridon | 345/84 |
| 5,760,761 A | 6/1998 | Sheridon | 345/107 |
| 5,767,826 A | 6/1998 | Sheridon et al. | 345/84 |
| 5,777,782 A | 7/1998 | Sheridon | 359/296 |
| 5,784,189 A | 7/1998 | Bozler et al. | 359/254 |
| 5,808,593 A | 9/1998 | Sheridon | 345/84 |
| 5,808,783 A | 9/1998 | Crowley | 359/296 |
| 5,815,306 A | 9/1998 | Sheridon et al. | 359/296 |
| 5,821,624 A | 10/1998 | Pasch | 257/776 |
| 5,825,529 A | 10/1998 | Crowley | 359/296 |
| 5,828,441 A | 10/1998 | Narita et al. | 355/32 |
| 5,866,284 A | 2/1999 | Vincent | 430/37 |
| 5,869,929 A | 2/1999 | Eida et al. | 313/501 |
| 5,877,844 A | 3/1999 | Matsumoto | 355/35 |

| Patent No. | Date | Inventor | Class |
|---|---|---|---|
| 5,891,479 A | 4/1999 | Sheridon | 425/8 |
| 5,892,497 A | 4/1999 | Robertson | 345/107 |
| 5,893,206 A | 4/1999 | Furlani et al. | 29/608 |
| 5,894,367 A | 4/1999 | Sheridon | 359/623 |
| 5,900,192 A | 5/1999 | Richley | 264/8 |
| 5,900,858 A | 5/1999 | Richley | 345/107 |
| 5,904,790 A | 5/1999 | Sheridon | 156/83 |
| 5,906,743 A | 5/1999 | Cohen et al. | 210/502.1 |
| 5,914,805 A | 6/1999 | Crowley | 359/296 |
| 5,917,646 A | 6/1999 | Sheridon | 359/296 |
| 5,919,409 A | 7/1999 | Sheridon | 264/8 |
| 5,922,268 A | 7/1999 | Sheridon | 264/437 |
| 5,930,026 A | 7/1999 | Jacobson et al. | 359/296 |
| 5,940,054 A | 8/1999 | Harris | 345/85 |
| 5,956,005 A | 9/1999 | Sheridon | 345/84 |
| 5,961,804 A | 10/1999 | Jacobson et al. | 204/606 |
| 5,969,472 A | 10/1999 | Kisner | 313/484 |
| 5,972,493 A | 10/1999 | Iwasaki et al. | 428/323 |
| 5,974,901 A | 11/1999 | Zborowski et al. | 73/865.5 |
| 5,975,680 A | 11/1999 | Wen et al. | 347/43 |
| 5,976,428 A | 11/1999 | Richley | 264/10 |
| 5,982,346 A * | 11/1999 | Sheridon et al. | 345/85 |
| 5,986,629 A | 11/1999 | Smith et al. | 345/84 |
| 5,989,629 A | 11/1999 | Sacripante et al. | 427/180 |
| 6,014,116 A | 1/2000 | Haynes et al. | 345/1 |
| 6,014,247 A | 1/2000 | Winter et al. | 359/296 |
| 6,017,584 A | 1/2000 | Albert et al. | 427/213.3 |
| 6,034,807 A | 3/2000 | Little et al. | 359/227 |
| 6,038,059 A | 3/2000 | Silverman | 359/296 |
| 6,054,071 A | 4/2000 | Mikkelsen, Jr. | 264/1.36 |
| 6,054,809 A | 4/2000 | Haynes et al. | 313/505 |
| 6,055,091 A | 4/2000 | Sheridon et al. | 359/296 |
| 6,067,185 A | 5/2000 | Albert et al. | 359/296 |
| 6,072,621 A | 6/2000 | Kishi et al. | 359/296 |
| 6,097,531 A | 8/2000 | Sheridon | 359/296 |
| 6,110,538 A | 8/2000 | Sheridon | 427/457 |
| 6,118,419 A | 9/2000 | Smith et al. | 345/84 |
| 6,120,588 A | 9/2000 | Jacobson | 106/31.16 |
| 6,120,839 A | 9/2000 | Comiskey et al. | 427/213.3 |
| 6,122,094 A | 9/2000 | Silverman | 359/296 |
| 6,128,124 A | 10/2000 | Silverman | 359/296 |
| 6,130,773 A | 10/2000 | Jacobson et al. | 359/296 |
| 6,137,467 A | 10/2000 | Sheridon et al. | 345/107 |
| 6,147,791 A | 11/2000 | Sheridon | 359/296 |
| 6,162,321 A | 12/2000 | Silverman | 156/330 |
| 6,174,153 B1 | 1/2001 | Sheridon | 425/3 |
| RE37,085 E | 3/2001 | Sheridon | 428/323 |
| 6,196,848 B1 | 3/2001 | Yamazaki | 434/409 |
| 6,197,228 B1 | 3/2001 | Sheridon | 264/1.36 |
| 6,211,998 B1 | 4/2001 | Sheridon | 359/296 |
| 6,222,513 B1 | 4/2001 | Howard et al. | 345/84 |
| 6,243,058 B1 | 6/2001 | Mikkelsen et al. | 345/84 |
| 6,251,329 B1 | 6/2001 | Sheridon | 264/427 |
| 6,383,619 B1 | 5/2002 | Engler et al. | 428/212 |
| 6,396,621 B1 | 5/2002 | Sheridon | 359/296 |
| 6,421,035 B1 | 7/2002 | Sheridon et al. | 345/85 |
| 6,428,868 B1 | 8/2002 | Sheridon et al. | 428/40.2 |
| 6,441,946 B1 | 8/2002 | Sheridon | 359/296 |
| 6,473,072 B1 | 10/2002 | Comiskey et al. | 345/173 |
| 6,480,322 B2 | 11/2002 | Engler et al. | 359/296 |
| 6,485,280 B1 | 11/2002 | Richley | 425/8 |
| 6,487,002 B1 | 11/2002 | Biegelsen | 359/296 |
| 6,518,948 B1 * | 2/2003 | Berstis | 345/107 |
| 6,521,145 B1 | 2/2003 | Engler et al. | 264/1.9 |
| 6,524,500 B2 | 2/2003 | Sheridon et al. | 264/1.7 |
| 6,531,997 B1 | 3/2003 | Gates et al. | 345/107 |
| 6,549,327 B2 | 4/2003 | Foucher et al. | 359/296 |
| 6,556,470 B1 | 4/2003 | Vincent et al. | 365/151 |
| 6,559,820 B1 | 5/2003 | Mikkelsen, Jr. et al. | 345/84 |
| 6,570,700 B2 | 5/2003 | Engler et al. | 359/296 |
| 6,573,880 B1 | 6/2003 | Simoni et al. | 345/87 |
| 6,577,432 B2 | 6/2003 | Engler et al. | 359/296 |
| 6,588,131 B2 | 7/2003 | O'Connell, Jr. | 40/446 |
| 2002/0084539 A1 | 7/2002 | Sheridon et al. | 264/4 |
| 2002/0089475 A1 | 7/2002 | Sheridon | 345/84 |
| 2002/0089490 A1 | 7/2002 | Sheridon | 345/173 |
| 2002/0130831 A1 | 9/2002 | Engler et al. | 345/107 |
| 2002/0131148 A1 | 9/2002 | Engler et al. | 359/296 |
| 2002/0131149 A1 | 9/2002 | Engler et al. | 359/296 |
| 2002/0131150 A1 | 9/2002 | Engler et al. | 359/296 |
| 2002/0131151 A1 | 9/2002 | Engler et al. | 359/296 |
| 2002/0186197 A1 | 12/2002 | Biegelsen | 345/107 |
| 2002/0186450 A1 | 12/2002 | Foucher et al. | 359/296 |
| 2002/0186452 A1 | 12/2002 | Biegelsen | 359/296 |
| 2003/0046838 A1 | 3/2003 | O'Connell, Jr. | 40/452 |

OTHER PUBLICATIONS

I. Ota, et al., IEEE Conference on Display Devices, 72 CH 0707–0–ED 1972, pp. 46–49.

Ser. No. 09/200,553, Appln. by Sheridon.

Ser. No. 09/199,544, Appln. by Sheridon.

Ser. No. 09/465,801, Appln. by Biegelsen et al.

Ser. No. 09/563,504, Appln. by Knights.

Ser. No. 09/643,670, Appln. by Kazmaier et al.

Ser. No. 09/549,518, Appln. by Sheridon.

Ser. No. 09/517,522, Appln. by Silverman.

"Xerox PARC and 3M to collaborate on electronic paper," Information Today, vol. 16, No. 8, Sep. 1999.

Gibbs, "The Reinvention of Paper," Scientific American: Technology and Business, Sep. 1998.

Mattis, "Screen Saviors," Business 2.0, Jul. 1999.

Mann, "Who will own your next good idea?" The Atlantic Monthly, Sep. 1998, vol. 282, pp. 57–82.

Comiskey et al., "An electrophoretic ink for all–printed reflective electronic displays," Nature, Jul. 16, 1998, vol. 394, pp. 253–255.

Klein, "Will the future be written in E–Ink?" The Wall Street Journal, Jan. 4, 2000.

Wisnieff, "Printing Screen," Nature, Jul. 16, 1998, vol. 394, Issue No. 6690, pp. 225 and 227.

L.L. Lee, "A Magnetic–Particles Display," IEEE Transactions on Electron Devices, vol. ED–22, No. 9, Sep. 1975, pp. 758–765.

L.L. Lee, "Fabrication of Magnetic Particles Displays," Proceeding of the S.I.D., vol. 18/3 & 4 1977, pp. 283–288.

* cited by examiner

ROTATING ELEMENT SHEET MATERIAL WITH DUAL VECTOR FIELD ADDRESSING

RELATED APPLICATIONS

The following identified U.S. patent applications are relied upon and are fully incorporated herein by reference.

U.S. Patent Application entitled "Rotating element sheet material and stylus with gradient field addressing," by Nicholas K. Sheridon, filed on Jan. 11, 2001, and accorded Ser. No. 09/757,531.

U.S. Patent Application entitled "Fringe-field filter for addressable displays," by Nicholas K. Sheridon, filed on Jan. 11, 2001, and accorded Ser. No. 09/757,538.

INCORPORATION BY REFERENCE

The following U.S. patents are herein fully incorporated by reference:

U.S. Pat. No. 4,126,854 by Sheridan entitled "Twisting Ball Panel Display;"

U.S. Pat. No. 4,143,103 by Sheridan entitled "Method of Making a Twisting Ball Panel Display;"

U.S. Pat. No. 5,262,098 by Crowley et al, entitled "Method and Apparatus for Fabricating Bichromal Balls for a Twisting Ball Display;"

U.S. Pat. No. 5,389,945, by Sheridon entitled "Writing System Including Paper-Like Digitally Addressed Media and Addressing Device Therefor,"

U.S. Pat. No. 5,604,027 by Sheridon entitled "Some Uses of Microencapsulation for Electric Paper,"

U.S. Pat. No. 5,717,514 by Sheridon entitled "Polychromal Segmented Balls for a Twisting Ball Display,"

U.S. Pat. No. 5,767,826 by Sheridon et al, entitled "Subtractive Color Twisting Ball Display;"

U.S. Pat. No. 5,777,782 by Sheridon entitled "Auxiliary Optics for a Twisting Ball Display;"

U.S. Pat. No. 5,894,367 by Sheridon entitled "Twisting Cylinder Display Using Multiple Chromatic Values;"

U.S. Pat. No. 6,055,091 by Sheridon entitled "Twisting Cylinder Display;"

U.S. Pat. No. 6,097,531 by Sheridan entitled "Method of Making Uniformly Magnetized Elements for a Gyricon Display;"

U.S. Pat. No. 6,110,538 by Sheridon entitled "A Method of Making a Gyricon Display Using Magnetic Latching;"

U.S. patent application Ser. No. 08/960,865 by Sheridon et al. entitled "Twisting Cylinder Display;"

U.S. Pat. No. 6,222,513 by Howard et al. entitled "Charge Retention lands for Electric Paper And Applications Thereof;"

U.S. patent application Ser. No. 09/199,544 by Sheridon entitled "Gyricon Displays Utilizing Rotating Elements and Magnetic Latching;"

U.S. patent application Ser. No. 09/200,553 by Sheridon entitled "Gyricon Displays Utilizing Magnetic Elements and Magnetic Trapping;"

U.S. Pat. No. 6,174,153 by Sheridon entitled "An Apparatus For Making uniformly Magnetized Elements For A Gyricon Display;"

U.S. Pat. No. 6,251,329 by Sheridon entitled "A Method Of Making A Gyricon Display Using Magnetic Latching;"

U.S. Pat. No. 6,197,228 by Sheridon entitled "A Method Of Making A Gyricon Display Using Magnetic Latching;"

U.S. Pat. No. 6,211,998 by Sheridon entitled "Magnetic Unlatching And Addressing Of A Gyricon Display;"

U.S. patent application Ser. No. 09/465,801 by Biegelsen et al. entitle "System and method for rotatable element assembly and laminate substrate assembly;"

U.S. patent application Ser. No. 09/563,504 by Knights entitled "Rotating element sheet material with microstructured substrate and method of use;"

U.S. patent application Ser. No. 09/549,518 by Sheridon entitled "Rotating element sheet material with generalized containment structure;"

U.S. patent application Ser. No. 09/517,522 by Silverman entitled "Rotating element sheet material with reversible highlighting;" and U.S. patent application Ser. No. 09/643,670 by Kazmaier et al. entitled "Electromagnetophoretic display system and method."

FIELD OF THE INVENTION

The present invention relates to the preparation and use of rotating element sheet material including dual vector-field addressing components. More particularly, the present invention relates to the preparation and use of rotating element sheet material having both electric and magnetic addressing components.

BACKGROUND OF THE INVENTION

Rotating element sheet material has been disclosed in U.S. Pat. Nos. 4,126,854 and 4,143,103, both hereinabove incorporated by reference, and generally comprises a substrate, an enabling fluid, and a class of rotatable elements. As discussed more below, rotating element sheet material has found a use as "reusable electric paper." FIGS. 1 and 2 depict an enlarged section of rotating element sheet material 50, including rotatable element 10, enabling fluid 20, cavity 30, and substrate 40. Observer 60 is also shown. Although FIG. 2 depicts a cylindrically shaped rotatable element and cavity, many other shapes will work and are consistent with the present invention. As disclosed in U.S. Pat. No. 5,389,945, herein incorporated by reference, the thickness of substrate 40 may be of the order of hundreds of microns, and the dimensions of rotatable element 10 and cavity 30 may be of the order of 10 to 100 microns.

In FIGS. 1 and 2, substrate 40 is an elastomer material, such as silicone rubber, that accommodates both enabling fluid 20 and the class of rotatable elements within a cavity or cavities disposed throughout substrate 40. The cavity or cavities contain both enabling fluid 20 and the class of rotatable elements such that rotatable element 10 is in contact with enabling fluid 20 and at least one translational degree of freedom of rotatable element 10 is restricted. The contact between enabling fluid 20 and rotatable element 10 breaks a symmetry of rotatable element 10 and allows rotatable element 10 to be addressed. The state of broken symmetry of rotatable element 10, or addressing polarity, can be the establishment of an electric dipole about an axis of rotation. For example, it is well known that small particles in a dielectric liquid acquire an electrical charge that is related to the Zeta potential of the surface coating. Thus, an electric dipole can be established on a rotatable element in a dielectric liquid by the suitable choice of coatings applied to opposing surfaces of the rotatable element about an axis of rotation.

The use of rotating element sheet material as "reusable electric paper" is due to that fact that the rotatable elements are typically given a second broken symmetry, a multivalued aspect, correlated with the addressing polarity discussed above. That is, the above-mentioned coatings may be chosen so as to respond to incident electromagnetic energy in distinguishable ways, as indicated in FIG. 2, for example. Thus, an applied vector field can control the aspect of rotatable element 10 to favorably situated observer 60.

For example, as disclosed in U.S. Pat. No. 4,126,854, hereinabove incorporated by reference, rotatable element 10 may comprise a black polyethylene generally spherical body with titanium oxide sputtered on one hemisphere, where the titanium oxide provides a light-colored aspect in one orientation. Such a rotatable element in a transparent dielectric liquid will exhibit the desired addressing polarity as well as the desired aspect.

II.A. Rotatable Elements with Two-valued Aspects

A multivalued aspect in its simplest form is a two-valued aspect. When the aspect is the chromatic response to visible light, a rotatable element with a two-valued aspect can be referred to as a bichromal rotatable element. Such a rotatable element may be fabricated by the union of two layers of material as described in U.S. Pat. Nos. 5,262,098 and 6,147,791, herein incorporated by reference.

FIGS. 3–6 depict rotatable element 10 with a two-valued aspect and an exemplary system that use such rotatable elements from the prior art. In FIG. 3, rotatable element 10 is composed of first layer 70 and second layer 80 and is, by way of example again, a generally cylindrical body. The surface of first layer 70 has first coating 75 at a first Zeta potential, and the surface of second layer 80 has second coating 85 at a second Zeta potential. First coating 75 and second coating 85 are chosen such that, when in contact with a dielectric fluid (not shown), first coating 75 has a net negative electric charge with respect to second coating 85. This is depicted in FIG. 3 by the "−" and "+" symbols respectively. Furthermore, the combination of first coating 75 and the surface of first layer 70 is white-colored, and the combination of second coating 85 and the surface of second layer 80 is non-white-colored, indicated in FIG. 3 by hatching. One skilled in the art should appreciate that the material associated with first layer 70 and first coating 75 may be the same. Likewise, the material associated with second layer 80 and second coating 85 may be the same.

FIG. 4 depicts no-field set 110. No-field set 110 is a subset of randomly oriented rotatable elements in the vicinity of vector field 100 when vector field 100 has zero magnitude. Vector field 100 is an electric field. No-field set 110, thus, contains rotatable elements with arbitrary orientations with respect to each other. Therefore, observer 60 in the case of no-field set 110 registers views of the combination of second coating 85 and the surface of second layer 80, and first coating 75 and the surface of first layer 70 (as depicted in FIG. 3) in an unordered sequence. Infralayer 55 forms the backdrop of the resulting view. Infralayer 55 can consist of any type of material, including but not limited to other rotatable elements, or some material that presents a given aspect to observer 60.

FIGS. 5 and 6 depict first aspect set 120. First aspect set 120 is a subset of rotatable elements in the vicinity of vector field 100 when the magnitude of vector field 100 is nonzero and has the orientation indicated by arrow 105. In first aspect set 120, all of the rotatable elements orient themselves with respect to arrow 105 due to the electrostatic dipole present on each rotatable element 10. In contrast to no-field set 110, observer 60 in the case of first aspect set 120 registers a view of a set of rotatable elements ordered with the non-white-colored side up (the combination of second coating 85 and the surface of second layer 80 as depicted in FIG. 3). Again, infralayer 55 forms the backdrop of the resulting view. In FIGS. 5 and 6, rotatable element 10, under the influence of applied vector field 100, orients itself with respect to vector field 100 due to the electric charges present as a result of first coating 75 and second coating 85. FIG. 5 is a side view indicating the relative positions of observer 60, first aspect set 120, and infralayer 55. FIG. 6 is an alternate view of first aspect set 120 from a top perspective. In FIG. 6, the symbol ⊙ indicates an arrow directed out of the plane of the figure.

One skilled in the art should appreciate that first aspect set 120 will maintain its aspect after applied vector field 100 is removed, in part due to the energy associated with the attraction between rotatable element 10 and the substrate structure, as, for example, cavity walls (not shown). This energy contributes, in part, to the switching characteristics and the memory capability of rotating element sheet material 50, as disclosed in U.S. Pat. No. 4,126,854, hereinabove incorporated by reference, and discussed in more detail below.

Further still, one skilled in the art should appreciate that no-field set and first aspect set discussed above in FIGS. 4–6 can form the elements of a pixel, where vector field 100 can be manipulated on a pixel by pixel basis using an addressing scheme as discussed, for example, in U.S. Pat. No. 5,717,515, herein incorporated by reference.

For example, U.S. Pat. No. 4,126,854 entitled "Twisting Ball Panel Display" issued Nov. 21, 1978, and U.S. Pat. No. 4,143,103 entitled "Method Of Making A Twisting Ball Display," issued Mar. 6, 1979, both by Sheridon, describe a rotating element sheet material that comprises bichromal rotatable elements contained in fluid-filled cavities and embedded in an elastomer medium. One segment of the bichromal rotatable elements has a larger electrical charge in contact with the fluid and in the presence of the electrical field than the other segment. Thus, for a given polarity of applied electrical field, one segment will rotate toward and be visible to an observer of the display. Applying the opposite polarity of electrical field will cause the rotatable element to rotate and present the other segment to be seen by the observer.

U.S. Pat. No. 4,143,103 describes the response of the bichromal rotatable element to the applied electrical field as a threshold response. That is, as the external field is increased, the bichromal rotatable element remains stationary in position until a threshold voltage is reached, at which time the rotatable element starts to rotate from its initial position. The amount of rotation increases with an increasing electrical field until a 180-degree rotation can be achieved. The value of the external field that causes a 180-degree rotation is called the full addressing voltage.

The response pattern of the bichromal rotatable element to an external electrical field determines the type of addressing that may be used to create images on the rotating element sheet material. There are known in the art three types of addressing schemes for displays. The first of these is active matrix addressing, which places the least demands on the properties of the display.

In active matrix addressing a separate addressing electrode is provided for each pixel of the display and each of these electrodes is continuously supplied with an addressing voltage. The complete set of voltages can be changed for each addressing frame. While this type of addressing places the least demands on the properties of the display medium, active matrix addressing is the most expensive, most complicated and least energy efficient type of addressing.

The second type of addressing scheme is passive matrix addressing. Passive matrix addressing makes use of two sets of electrodes, one on each side of the display medium. Typically, one of these consists of horizontal conductive lines and the other consists of vertical conductive lines. The conductive lines on the front surface or window of the display are necessarily aspect-transparent. To address the display medium a voltage is placed on a horizontal conductive line and a voltage is placed on a vertical conductive line. The segment of medium located at the intersection of these two lines experiences a voltage equal to the sum of these two voltages. If the voltages are equal, as they usually are, the sections of medium located adjacent to the each of the lines, but not at the intersection of the lines, experience ½ the voltage experienced by the section of medium at the line intersection. Passive addressing is less complicated and more energy efficient because the pixels of the display medium are addressed only for as long as is required to change their optical states. However, the requirements for a medium that can be addressed with a passive matrix display are significantly greater than for the active matrix case. The medium must respond fully to the full addressing voltage but it must not respond to ½ the full addressing voltage. This is called a threshold response behavior. The medium must also stay in whichever optical state it has been switched into by the addressing electrodes without the continuous application of voltage—that is, it should store the image without power. Passive addressing is the most widely used method of addressing displays and is the lowest cost.

The third type of addressing consists of a linear array of addressing electrodes in the form of a bar that can be moved over the surface of the sheet material. In this form of addressing, the sheet material is placed over or incorporates a grounding electrode and is protected from possible mechanical damage from the moving bar by placing a thin window between the bar and the rotating element sheet material. As the bar is moved over the sheet material, it applies voltages to specific pixels of the sheet material for short periods of time and generates a full image each time the bar is scanned over the surface. In one variation of this method, the addressing bar deposits image-wise charge on the surface of the window.

The requirements imposed on the sheet material by this form of addressing then depend on which type of addressing bar is used. If the addressing bar simply exposes the sheet material to voltages as it passes over the surface, then it is necessary for the rotating sheet material to exhibit threshold behavior. Thus the area of the sheet material directly under the addressing bar electrode must undergo a change in aspect when exposed to the full addressing voltage; but as the bar moves to the next row of pixels, this same area of sheet material must not respond to the diminished voltages experienced by the sheet material from the moving addressing bar. As in passive addressing, this requires that the sheet material have a sharp threshold response. This addressing bar also requires that the change in aspect occur completely during the time the addressing bar electrodes move over its vicinity, which usually limits the display frame addressing speed. U.S. patent application Ser. No. 09/037,767 by Howard et al. entitled "Charge Retention Islands For Electric Paper And applications Thereof" and also assigned to the same assignee as this application, describes an arrangement of addressing electrodes that greatly reduces the switching speed requirements of the medium due to this effect.

In U.S. patent application Ser. No. 09/037,767 the addressing bar deposits image-wise charge on or near the surface of the sheet material. The charge deposition addressing method relaxes the requirements on the sheet material. The addressing bar speed over the surface is limited only by the rate at which it can deposit image-wise charge, because the sheet material can respond to the voltage associated with the deposited charge pattern at its own speed. Threshold response behavior is not so important; however, the ability to store the image is because it can be expected that the image-wise charge deposited on the sheet material will leak off over a short period of time. However, addressing bars that can deposit image-wise charge on or near the sheet material tend to be bulky and more expensive than bars that simply impose image-wise voltages directly.

II.B. Rotatable Elements with Multivalued Aspect

A rotatable element with multivalued aspect may be generally fabricated as disclosed in U.S. Pat. No. 5,894,367, hereinabove incorporated by reference. An exemplary rotatable element 10 with multivalued aspect of the prior art is depicted in FIG. 7. Rotatable element 10 in FIGS. 7 and 8 is composed of core 140 within aspect-transparent cladding 137. Core 140 in FIGS. 7 and 8 is prism-shaped and is depicted as a square column. As used herein, the term "prism-shaped" refers to a polyhedron whose ends have substantially the same size and shape and are substantially parallel, and whose remaining sides are each substantially parallelograms. Depending upon the orientation of rotatable element 10 about an axis of rotation through core 140, rotatable element 10 may present first aspect surface 142, second aspect surface 144, third aspect surface 146, or fourth aspect surface 148 to a favorably situated observer. In FIG. 7, first aspect surface 142 and second aspect surface 144 are depicted from a view of one hemisphere of rotatable element 10, and in FIG. 8, third aspect surface 146 and fourth aspect surface 148 are depicted from a view of another hemisphere of rotatable element 10. In order to address rotatable element 10, the surface of aspect-transparent cladding 137 above first aspect surface 142 has first coating 130 at a first Zeta potential, and the surface of aspect-transparent cladding 137 above third aspect surface 146 has second coating 135 at a second Zeta potential such that first coating 130 has a net negative charge, "−," with respect to second coating 135 when rotatable element 10 is in contact with a dielectric fluid (not shown). One skilled in the art should appreciate that rotatable element 10 may also be fabricated without aspect-transparent cladding 137. Accordingly, rotatable element 10 may simply comprise a substantially cylindrical core with a suitable choice of coatings or material in order to present four aspects to a favorably situated observer.

Another embodiment of a rotatable element with a multivalued aspect is depicted in FIGS. 9 and 10, and is composed of core 150 within aspect-transparent cladding 137. Core 150 in FIGS. 9 and 10 is prism-shaped and is depicted as a triangular column. Again, depending upon the orientation of rotatable element 10 about an axis of rotation through core 150, rotatable element 10 may present first aspect surface 152, second aspect surface 154, or third aspect surface 156 to a favorably situated observer. In FIG. 9, first aspect surface 152 and second aspect surface 154 are depicted from a view of one hemisphere of rotatable element 10, and in FIG. 10, third aspect surface 156 and first aspect surface 152 are depicted from a view of another hemisphere of rotatable element 10. In order to address rotatable element 10, the surface of aspect-transparent cladding 137 above first aspect surface 152 has first coating 130 at a first Zeta potential, and the surface of aspect-transparent cladding 137 above the apex where third aspect surface 156 and second aspect surface 154 meet has second coating 135 at a second Zeta potential such that first coating 130 has a net negative charge, "−," with respect to second coating 135 when rotatable element 10 is in contact with a dielectric fluid (not shown). Again, one skilled in the art should appreciate that rotatable element 10 may be fabricated without aspect-transparent cladding 137. Accordingly, rotatable element 10 may simply comprise a substantially cylindrical core with a suitable choice of coatings or material in order to present three aspects to a favorably situated observer.

U.S. Pat. No. 5,894,367 describes the fabrication of rotatable element 10 from a macroscopic display element possessing scaled-up portions of material desired in the rotatable element. The macroscopic display element is then manipulated to form an extended filament so as to preserve the proportions of the component material. One skilled in the art should appreciate that this technique has been used in the production of optical fibers and channel electron multipliers.

Rotatable elements with multivalued aspect are generally utilized in rotating element sheet material that use canted vector fields for addressing. A canted vector field is a field whose orientation vector in the vicinity of a subset of rotatable elements can be set so as to point in any direction in three-dimensional space. U.S. Pat. No. 5,717,515, herein incorporated by reference, discloses the use of canted vector fields in order to address rotatable elements. The use of canted vector fields with rotating element sheet material 50 allows complete freedom in addressing the orientation of a subset of rotatable elements, where the rotatable elements have the addressing polarity discussed above. Exemplary systems utilizing rotatable elements with four-valued aspects and canted vector fields for addressing are depicted in FIGS. 11–17.

In FIG. 11, no-field set 160 depicts a subset of randomly oriented rotatable elements in the vicinity of vector field 100 when vector field 100 has zero magnitude. In no-field set 160, the rotatable elements have arbitrary orientations. Therefore, observer 60 in the case of no-field set 160 registers views of the combination of the surface of first aspect surface 142, second aspect surface 144, third aspect surface 146, and fourth aspect surface 148 in an unordered sequence. Again, infralayer 55 forms the backdrop of the aspect.

FIGS. 12 and 13 depict second aspect set 164 of the system introduced in FIG. 11. In second aspect set 164, observer 60 registers a coherent view of the combination of the second aspect surface 144. In second aspect set 164, all of the rotatable elements orient themselves such that first aspect surface 142 lies in the direction indicated by arrow 105, where arrow 105 indicates the direction of canted vector field 100. FIG. 12 is a side view indicating the relative positions of observer 60, second aspect set 164, and infralayer 55. FIG. 13 is an alternate view of second aspect set 164 from a top perspective.

Again, one skilled in the art should appreciate that fourth aspect set 168 will maintain its aspect after applied vector field 100 is removed due to the energy associated with the attraction between rotatable element 10 and the substrate structure, as, for example, cavity walls (not shown). This energy contributes, in part, to the switching characteristics and the memory capability of rotating element sheet material 50, as disclosed in U.S. Pat. No. 4,126,854, hereinabove incorporated by reference.

Further still, one skilled in the art should appreciate that by suitable orientation of vector field 100, as indicted by arrow 105, any of the four aspects surfaces may be viewed by observer 60.

II.C. Rotatable Elements with Multivalued Aspect and Magnetic Latching

When utilizing rotatable elements with more than two aspects and a canted addressing vector field, it is desirable to ensure that an aspect that is addressed will be stable about an orientation that provides maximum viewing exposure for that aspect being viewed. One manner of accomplishing this is disclosed in U.S. Pat. No. 6,147,791 entitled "Gyricon displays utilizing rotating elements and magnetic latching," herein incorporated by reference. Multiaspect rotatable elements consistent with the invention disclosed in U.S. Pat. No. 6,147,791 are depicted in FIGS. 14 and 15. The rotatable elements of FIGS. 14 and 15 are similar to those depicted in FIGS. 7–10 and described above. The rotatable elements of FIGS. 14 and 15, however, also comprise rotatable latching components 170, preferably located at the apex or intersection of aspect surfaces. FIG. 14 depicts a rotatable element with four aspects and four rotatable latching components 170. FIG. 15 depicts a rotatable element with three aspects and three rotatable latching components 170. The rotatable latching components 170 contained within the rotatable elements preferably comprise hard magnetic material, as disclosed in U.S. Pat. No. 6,147,791, hereinabove incorporated by reference. "Hard" magnetic materials are materials that exhibit some residual magnetism in the absence of an external field, such as ferromagnetic materials. Rotating element sheet material that provides maximum viewing exposure for an aspect being viewed and incorporating the rotatable elements of FIGS. 14 and 15 is depicted in FIGS. 16 and 17. FIG. 16 depicts rotating element sheet material 50 containing rotatable element 10 of FIG. 14 and includes sheet latching components 172. Similarly, FIG. 17 depicts rotating element sheet material 50 containing rotatable element 10 of FIG. 15 with sheet latching components 172. Sheet latching components 172 comprise soft magnetic material, or material that does not exhibit a significant amount of magnetization in the absence of an external field, such as paramagnetic or superparamagnetic materials. As depicted in FIGS. 16 and 17, the magnetic field that is present between rotatable latching components 170 and sheet latching components 172 will induce a torque about the axis of rotation of the rotatable element for any orientation other than the one that minimizes the distance between rotatable latching component 170 and sheet latching component 172.

One skilled in the art should also appreciate that rotatable latching components 170 and sheet latching components 172 will contribute to the "work function" associated with the attraction between rotatable element 10 and the substrate structure, as, for example, cavity walls (not shown), and that contribute to aspect stability. Again, this energy will contribute, in part, to the switching characteristics and the memory capability of rotating element sheet material 50, as disclosed in U.S. Pat. No. 4,126,854, hereinabove incorporated by reference.

II.D. Parity Vector

One skilled in the art should appreciate that there is an additional parameter associated with multi aspect rotatable elements as depicted in FIGS. 7–17. Specifically, such multi aspect rotatable elements that utilize canted vector fields for addressing will exhibit a "parity vector." The parity vector is a vector parallel to the axis of rotation of a multi aspect rotatable element and will have a direction associated with a specific ordering of multi aspect surfaces when proceeding in, for example, a clockwise rotation about the parity vector. Parity vector 270, in one embodiment, is depicted in FIGS. 18 and 19. For exemplary purposes only, rotatable element 10 in FIGS. 18 and 19 is configured such that first aspect surface 142 exhibits a red aspect, second aspect surface 144 exhibits a green aspect, third aspect surface 146 exhibits a blue aspect, and fourth aspect surface 140 exhibits a white aspect. This is depicted in FIGS. 18 and 19 by the use of the labels "R," "G," "B," and "K" respectively. Parity vector 270 is parallel to the axis of rotation and is selected in FIGS. 18 and 19 to be in the same direction as a vector directed out of the axis of the rotatable element when a clockwise rotation (as indicated by arrow 271) produces the sequence "R," "K," "B," "G," "R," etc. to favorably situated observer 60 (FIG. 18). Accordingly, parity vector 270 is parallel to the axis of rotation and is selected to be in the same direction as a vector directed into the axis of the rotatable element when a counterclockwise rotation (as indicated by arrow 273) produces the sequence "R," "K," "B," "G," "R," etc. to favorably situated observer 60 (FIG. 19).

When addressing a plurality of multi aspect rotatable elements using a canted vector field, it is important that all of the rotatable elements in the rotating element sheet material exhibit a parity vector in the same direction. It is important due to the fact that a canted vector field directed to, for example, the right as in FIGS. 12 and 13 will cause the plurality of rotatable elements to exhibit the same aspect surface only if all of the parity vectors of the plurality of rotatable elements point in the same direction. One method of ensuring that a plurality of rotatable elements share the same parity vector is by magnetizing the rotatable element along the parity vector when it is manufactured, and prior to dispersing the plurality of rotatable elements to a plurality of cavities in the substrate. When the plurality of rotatable elements are dispersed in the substrate, as depicted in FIG. 20, the rotatable elements may be easily induced to self-align according to the magnetic polarity, and hence the parity vector. Accordingly, after the rotatable elements have been secured in the substrate and are ready to be addressed by an addressing vector field (as an electric field), they will exhibit the same direction for the plurality of parity vectors 270.

II.E. Work Function

As discussed above, a useful property of rotating element sheet material is the ability to maintain a given aspect after applied vector field 100 for addressing is removed. This ability contributes, in part, to the switching characteristics and the memory capability of rotating element sheet material 50, as disclosed in U.S. Pat. No. 4,126,854, hereinabove incorporated by reference. This will be referred to as aspect stability. The mechanism for aspect stability in the above embodiments is generally the energy associated with the attraction between the rotatable elements and the containment structure, or "work function." A host of factors influence the magnitude of the energy associated with the work function including, but not limited to: surface tension of enabling fluid in contact with rotatable elements; the relative specific gravity of the rotatable elements to the enabling fluid; magnitude of charge on rotatable elements in contact with containment structure; relative electronic permittivity of enabling fluid and containment structure; "stickiness" of containment structure; and other residual fields that may be present. The applied vector field for addressing must be strong enough to overcome the work function in order to cause an orientation change; furthermore, the work function must be strong enough to maintain this aspect in the absence of an applied vector field for addressing.

FIG. 21 depicts an exemplary diagram of number 180, N, of rotatable elements that change orientation as a function of applied vector field 102, V of the prior art. The work function 184, $V_W$, corresponds to the value of applied vector field 102 when the number 180 of rotatable elements that change orientation has reached the saturation level 186, $N_s$, corresponding to the orientation change of all rotatable elements 10.

II.F. Use of Magnetic Fields for Addressing

One manner of introducing a magnetic field to a region is depicted in FIG. 22. One skilled in the art should appreciate that a current 190, I, introduced to a current loop 194, will create a magnetic field. Exemplary flux lines 196 associated with the current 190 and current loop 194 are also depicted. Another manner of introducing a magnetic field to a region (not shown) is to introduce material to the region that exhibits inherent magnetization, such as a stylus composed of ferromagnetic material.

Again, in order to address rotatable elements with a vector field, the vector field must provide enough energy to overcome the work function. Conventionally, this energy has been provided by the interaction between a dipole and a vector field. One skilled in the art should appreciate that the energy U associated with the interaction of a dipole d in a vector field V may be expressed as a dot product between the dipole d and vector field V:

$$U = -d \cdot V$$

Lee (L. L. Lee, "A Magnetic Particles Display," IEEE Trans. On Elect. Devices, Vol. ED-22, Number 9, September 1975 and L. L. Lee, "Matrix Addressed Magnetic Particles Display," in 1977 Soc. For Information Display International Symposium, Digest of Technical Papers, Boston, April 1977) has described the addressing of a twisting rotating element display in which the rotatable elements have a magnetic dipole with magnetic fields. U.S. Pat. No. 3,036,388 by Tate, and issued in May 1962 uses a stylus consisting of a magnetic dipole to address a display consisting of magnetized particles having black and white surfaces corresponding to a given magnetic polarity. More recently, U.S. Pat. No. 5,411,398 by Nakanishi et al. and entitled "Magnetic Display System" describes the use of a magnetic dipole to address a display consisting of black ferromagnetic particles and white, non-magnetic particles dispersed in an oil and in turn contained in microcapsules arranged in a layer. Upon application of a magnetic dipole, the black ferromagnetic particles are pushed to the rear of the microcapsules, revealing only the white particles, or pulled to the front of the microcapsules so that mostly only the black ferromagnetic particles can be seen by an observer.

It remains desirable, therefore, to utilize alternative forms of addressing rotating element sheet material in order to produce an aspect to a favorably situated observer.

SUMMARY OF INVENTION

In a first embodiment, the rotating element sheet material of the present invention comprises a plurality of rotatable elements disposed in a substrate and in contact with an enabling fluid, where at least one of the plurality of rotatable elements comprises: a core configured to present a first aspect in a first orientation and a second aspect in a second orientation, and where the first orientation and the second orientation are related by a rotational transformation about an axis of the rotatable element, and where the rotatable element in contact with the enabling fluid is further configured to exhibit a first addressing dipole configured to respond to a first vector field and a second addressing dipole configured to respond to a second vector field, and where the first addressing dipole and the second addressing dipole are configured such that the rotatable element exhibits the first aspect in the first vector field in a first direction and the second aspect in the second vector field in the first direction.

In a second embodiment, a system consistent with the present invention comprises the rotating element sheet material described above and an addressing system comprising an addressor; a first overlay, and a second overlay; where the addressing system introduces addressing vector fields capable of influencing the orientation of a subset of said plurality of rotatable elements due to the addressing dipoles of the rotatable elements.

In a third embodiment of the present invention, a method of addressing the rotating element sheet material described above comprises introducing a first vector field and a second vector field.

BRIEF DESCRIPTION OF THE DRAWINGS

The accompanying drawings, which are incorporated in and constitute a part of this specification, illustrate an implementation of the invention and, together with the description, serve to explain the advantages and principles of the invention. In the drawings.

DETAILED DESCRIPTION

Figure 1:
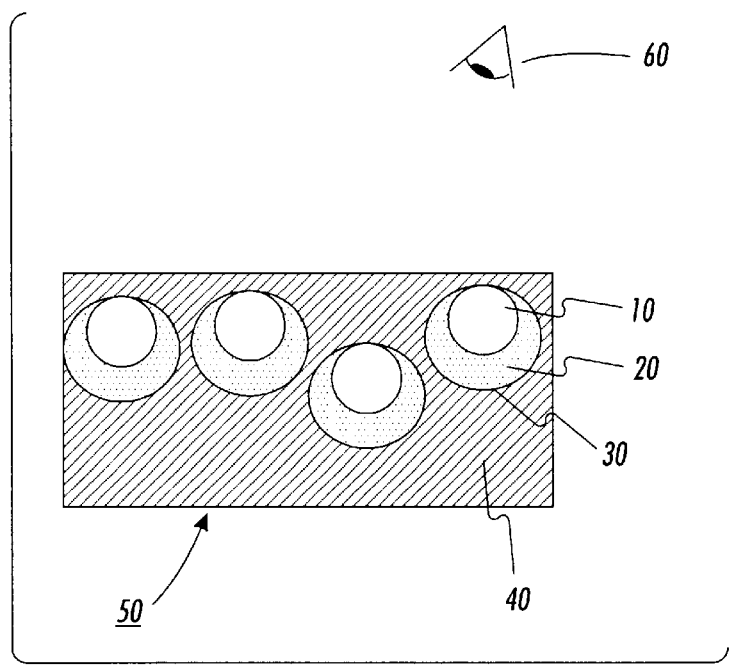
FIG. 1 depicts rotating element sheet material of the prior art.
Figure 2:
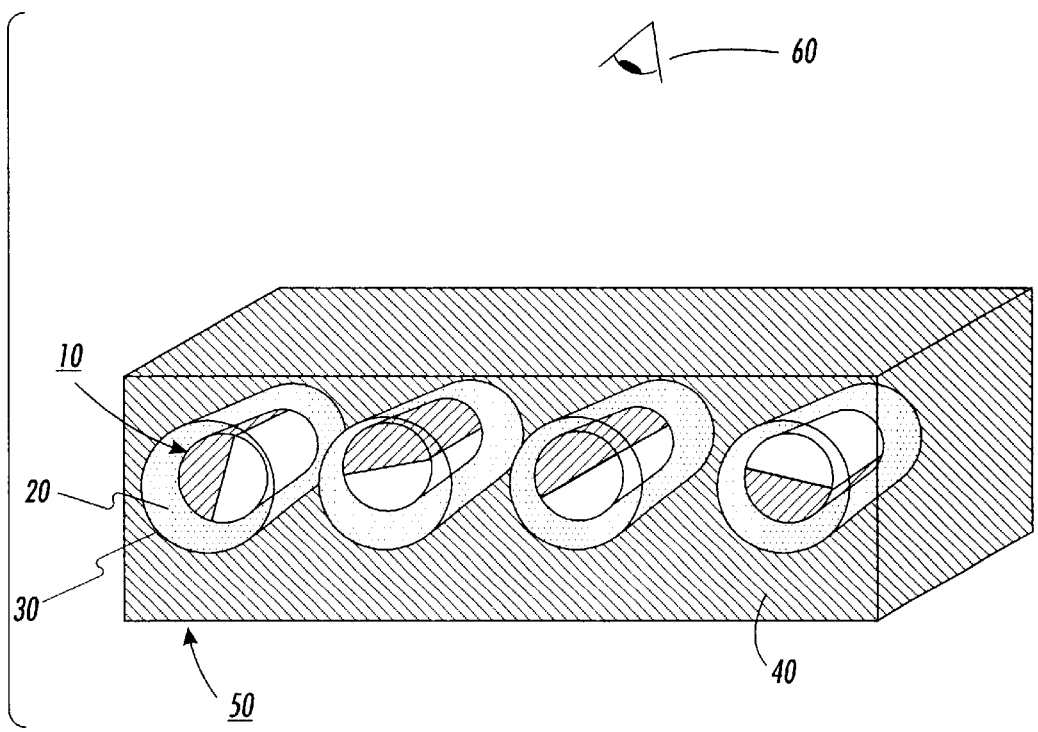
FIG. 2 depicts another view of rotating element sheet material of the prior art.
Figure 3:
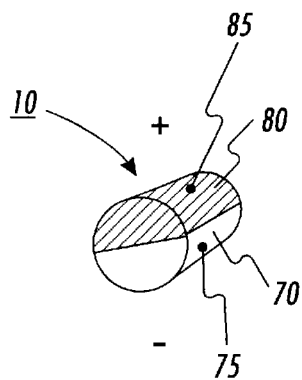
FIG. 3 depicts a rotatable element of the prior art.
Figure 4:
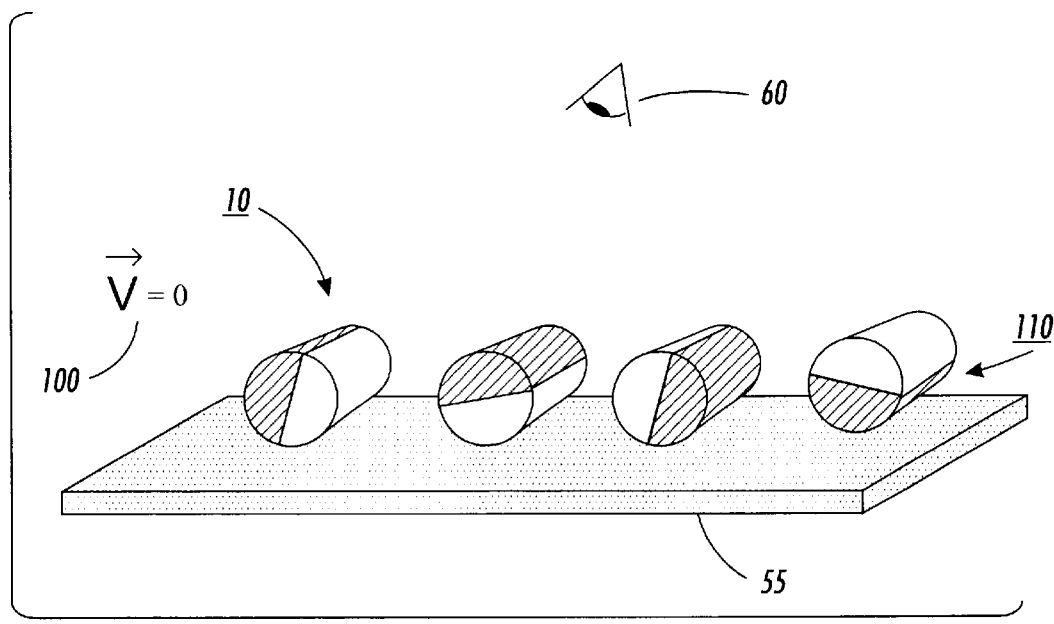
FIG. 4 depicts a set of rotatable elements of the prior art in the presence of an addressing vector field with zero amplitude.
Figure 5:
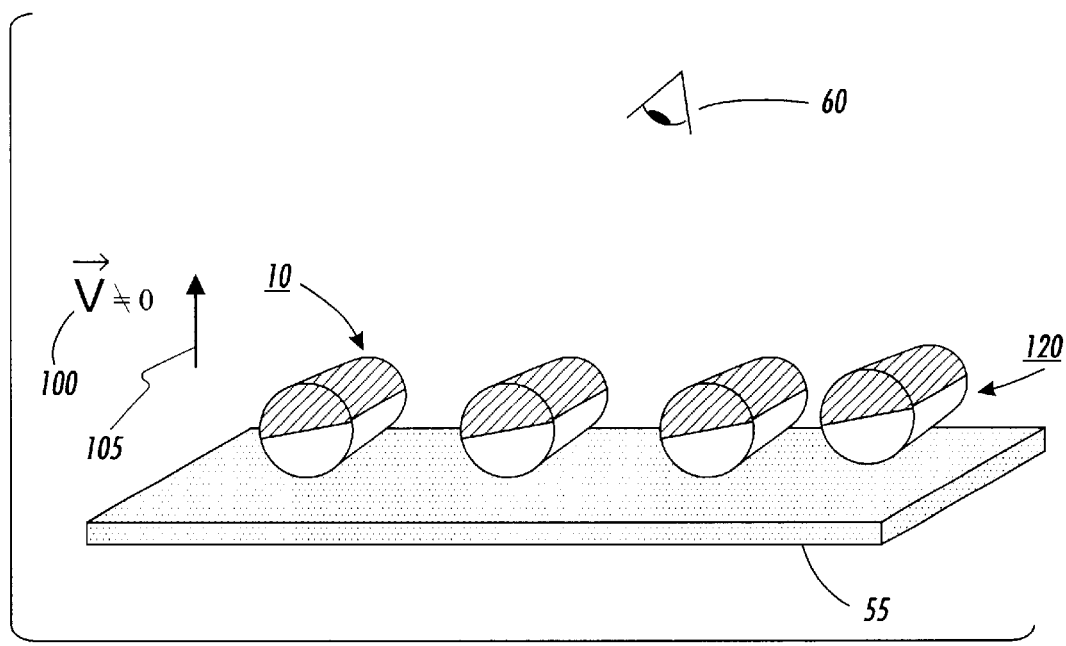
FIG. 5 depicts a set of rotatable elements of the prior art in the presence of an addressing vector field with nonzero magnitude.
Figure 6:
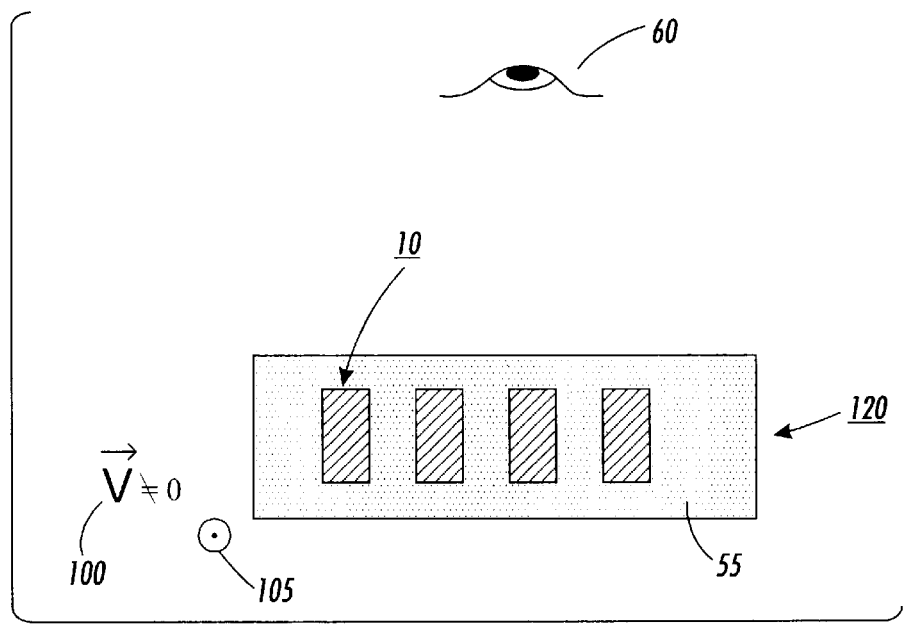
FIG. 6 depicts an alternate view of the set of rotatable elements of FIG. 5.

Reference will now be made in detail to an implementation consistent with the present invention as illustrated in the accompanying drawings. Whenever possible, the same reference number will be used throughout the drawings and the following description to refer to the same or like parts.

V.A. Definitions

As used herein, "aspect" refers to a common response to incident electromagnetic energy of interest. For example, if the incident electromagnetic energy of interest lies in the visible spectrum, then a first aspect may correspond to a black appearance, and a second aspect may correspond to a white appearance. If the incident electromagnetic energy of interest lies in the x-ray region, then a first aspect may correspond to the transmission of the x-ray energy, while a second aspect may correspond to the absorption of the x-ray energy. Furthermore, the "common response" may comprise any of the phenomena of absorption, reflection, polarization, transmission, fluorescence, or any combination thereof.

As used herein, "observer" refers to a human perceiver, or to a human perceiver in conjunction with an apparatus sensitive to the electromagnetic energy of interest. If the electromagnetic energy of interest lies in the visible spectrum, then observer may refer to a human perceiver. If the electromagnetic energy of interest lies outside of the visible spectrum, then observer refers to an apparatus sensitive to the electromagnetic energy and capable of resolving the aspects of interest into human perceivable form.

As used herein, "diameter" refers to an order of magnitude dimension corresponding to any of height, width, and depth of any microencapsulation structure or aspect elements. The use of "diameter" does not imply that circular, spherical, or cylindrical geometry only is under consideration.

As used herein, "vector field" refers to a field whose amplitude in space is capable of having a magnitude and a direction. Vector fields of interest in the present invention include electric fields, magnetic fields, or electromagnetic fields.

As used herein, "work function" refers to the amount of energy necessary to overcome the attraction between an aspect element and the microencapsulation structure so as to enable displacement. As mentioned above, a host of factors influence the magnitude of the energy associated with the work function including, but not limited to: surface tension of first aspect medium in contact with second aspect element; the relative specific gravity of first aspect medium to second aspect element; magnitude of charge on second aspect element; relative electronic permittivity of first aspect medium and microencapsulation structure; "stickiness" of microencapsulation structure; and other residual fields that may be present.

As used herein, "parity vector" refers to a vector in the direction of a vector product of a second vector and a first vector (in that order), where the first vector is defined by the direction of the first aspect surface from the axis of rotation and the second vector is defined by the direction of the second aspect surface from the axis of rotation of the rotatable element. One skilled in the art should appreciate that, in some instances, it is preferable to arrange multi-aspect rotatable elements in a substrate such that all of the parity vectors of the rotatable elements are in the same direction.

As used herein, the term "prism-shaped" refers to a polyhedron whose ends have substantially the same size and shape and are substantially parallel, and whose remaining sides are each substantially parallelograms.

V.B. First Embodiment of a Rotatable Element

Figure 23:
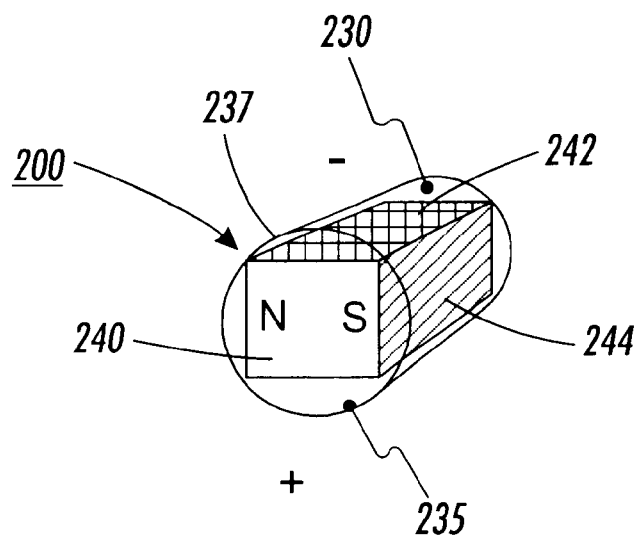
FIG. 23 depicts a first embodiment of a rotatable element of the present invention.
Figure 24:
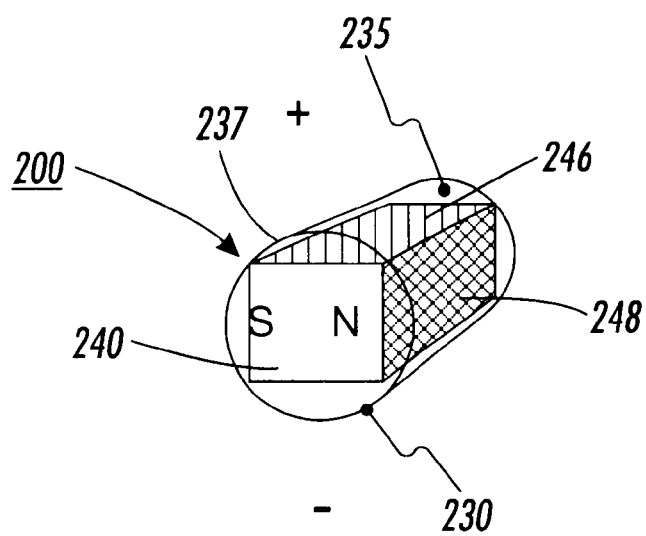
FIG. 24 depicts another perspective of the rotatable element of FIG. 23.

Rotatable element 200 consistent with a first embodiment of the present invention is depicted in FIGS. 23 and 24. FIG. 23 depicts rotatable element 200 comprising core 240 and aspect-transparent cladding 237. Core 240 in FIGS. 23 and 24 is prism-shaped and is depicted as a square column. Core 240 further comprises a material that exhibits magnetism in the absence of an external magnetic field, depicted in FIGS. 23 and 24 by the notation "N" for "north magnetic polarity" and "S" for "south magnetic polarity." One skilled in the art should appreciate, however, that it is rotatable element 200 as a whole that is configured to exhibit magnetism. Accordingly, although FIGS. 23 and 24 depict core 240 as exhibiting magnetism, aspect-transparent cladding 237 may also exhibit magnetism consistent with the present invention, either in addition to core 240, or exclusively.

Figure 7:
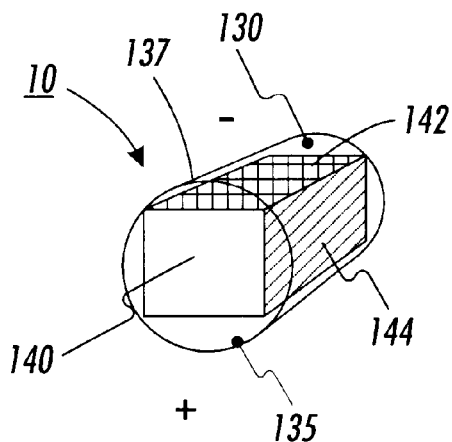
FIG. 7 depicts a rotatable element of the prior art with multivalued aspect.
Figure 8:
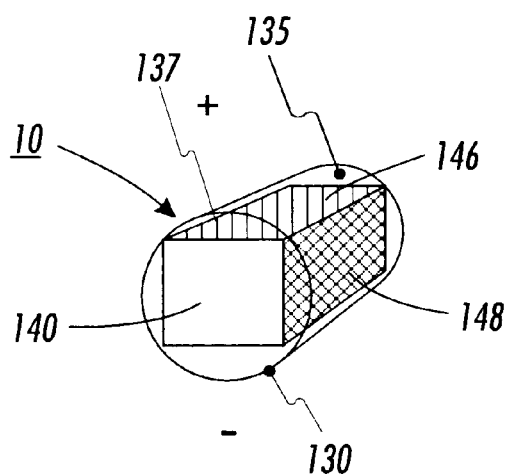
FIG. 8 depicts another perspective of the rotatable element of FIG. 7.

Core 240 in FIGS. 23 and 24 is further configured to exhibit at most four aspects. FIG. 23 depicts rotatable element 200 from a perspective where first aspect surface 242 and second aspect surface 244 are illustrated. FIG. 24 depicts rotatable element 200 from a perspective where third aspect surface 246 and fourth aspect surface 248 are illustrated. As described earlier with respect to rotatable element 10 of FIGS. 7 and 8, the surface of aspect-transparent cladding 237 in FIGS. 23 and 24 above first aspect surface 242 has first coating 230 at a first Zeta potential, and the surface of aspect-transparent cladding 237 above third aspect surface 246 has second coating 235 at a second Zeta potential such that first coating 230 has a net negative charge, "−," with respect to second coating 235 when rotatable element 200 is in contact with a dielectric fluid (not shown).

Suitable optically transparent materials for aspect-transparent cladding 237 include the polycarbonate polymers, the acrylic polymers and the polyolefin polymers, such as Polywax 1000 by the Baker Petrolite Corp. and the various grades of TPX by the Mitsui Petrochemical Industries, Ltd. These would be used in combinations, since each can be expected to have a different Zeta potential in contact with the enabling fluid. These materials are also generally suitable for the fabrication of the other parts of rotatable element 200, as described in pending U.S. patent application Ser. No. 09/427,656, herein incorporated by reference. A suitable magnetic pigment which may be incorporated into rotatable element 200 is magnetic pigment type 031182 by Wright Industries, Brooklyn, N.Y., either alone or in conjunction with other pigments known in the art, such as AKER CHEMICAL Cresyl violet blue, BAKER CHEMICAL Rhodamine 6G, DUPONT Rhodamine BI, DUPONT Spirit Blue NS, DUPONT Victoria Blue B base, ALLIED CHEMICALS Iosol Blue, EASTMAN Acridine orange, CALCO OIL blue N, and CALCO OIL black, DUPONT R900 titanium dioxide, FERRO 6331 black pigment, CABOT MOGUL L carbon black, and CABOT MONARCH 1000 carbon black.

One skilled in the art should appreciate that rotatable element 200 may also be fabricated without aspect-transparent cladding 237. Accordingly, rotatable element 200 may simply comprise a substantially cylindrical core with a suitable choice of coatings or material in order to present four aspects to a favorably situated observer.

Furthermore, the magnetism that is exhibited by rotatable element 200 is configured such that the first polarity, for example "N," corresponds to the region of rotatable element 200 where fourth aspect surface 248 may be viewed through aspect transparent cladding 237 by a favorably situated observer; and the second polarity, for example "S," corresponds to the region of rotatable element 200 where second aspect surface 244 may be viewed through aspect transparent cladding 237 by a favorably situated observer. Accordingly, rotatable element 200 consistent with one embodiment of the present invention is configured to exhibit both an electric dipole and a magnetic dipole when rotatable element 200 is in contact with a dielectric fluid (not shown), and where each polarity of each dipole is correlated with one aspect surface of the four aspect surfaces of core 240 within aspect-transparent cladding 237. FIGS. 25–28 depict rotatable element 200 and an addressing system consistent with the first embodiment of the present invention and illustrates four stable orientations of rotatable element 200.

The addressing system of FIGS. 25–28 comprises controller 330, first electrode 332 within first overlay 510, and second electrode 334 and current loop 336 within second overlay 520. First overlay 510 and second overlay 520 are configured to lie on either side of the substrate (not shown) of the rotating element sheet material. Accordingly, rotatable element 200 will lie within the region influenced by first electrode 332, second electrode 334 and current loop 336. Controller 330 is configured to introduce, either selectively or simultaneously, an electric polarity between first electrode 332 and second electrode 334, and a magnetic polarity associated with current loop 336. One skilled in the art should appreciate that the electric polarity between first electrode 332 and second electrode 334 may be such that first electrode 332 exhibits a net negative charge with respect to second electrode 334, or the electric polarity between first electrode 332 and second electrode 334 may be such that first electrode 332 exhibits a net positive charge with respect to second electrode 334. One skilled in the art should further appreciate that the current through current loop may be such that it travels in a clockwise manner or in a counterclockwise manner (from a given perspective).

Figure 25:
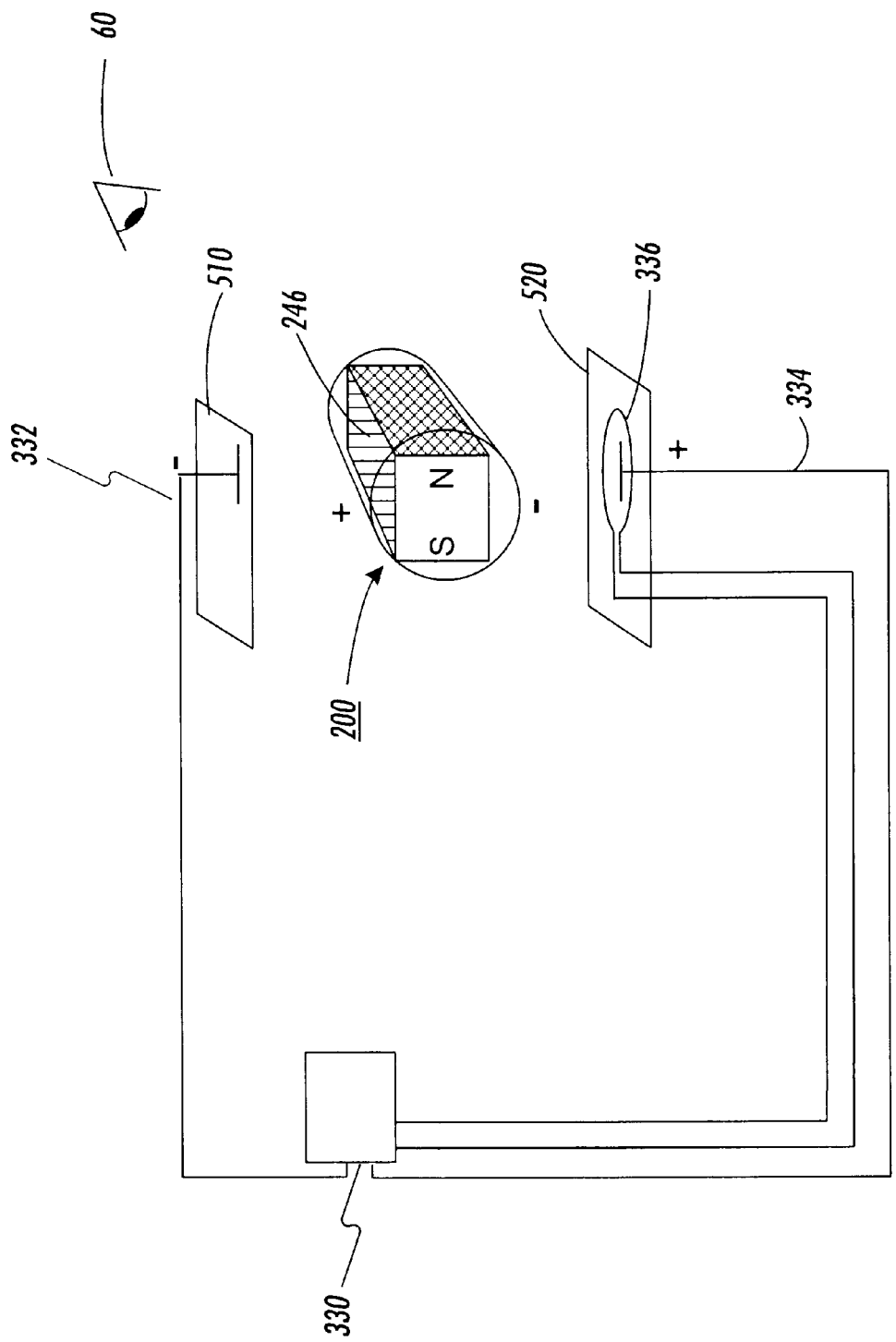
FIG. 25 depicts an addressing system and the rotatable element of FIGS. 23 and 24 in a first orientation.

FIG. 25 depicts a stable configuration of an addressing system and rotatable element 200 in one embodiment of the present invention when controller 330 operates such that first electrode 332 has a net negative charge (indicated with the "−" symbol) with respect to second electrode 334. Accordingly, a stable orientation for rotatable element 200 is one where the region of rotatable element 200 that exhibits the net positive charge when in contact with a dielectric fluid is proximal to first electrode 332, and the region of rotatable element 200 that exhibits the net negative charge when in contact with a dielectric fluid is proximal to second electrode 334. One skilled in the art should appreciate that when the electric field E introduced between first electrode 332 and second electrode 334 interacts with the electric dipole p exhibited by rotatable element 200 such that the energy −E·p is greater than any residual work function that may be present associated with rotatable element 200 in rotating element sheet material, the rotatable element will experience a net torque in any orientation other than that depicted in FIG. 25. The net torque in some instances may arise from a net monopole of rotatable element 200 interacting with the vector field in conjunction with the random fluctuations in the flow of the enabling fluid (not shown) at the surface of rotatable element 200. Accordingly, observer 60 in FIG. 25 is favorably situated to observe third aspect surface 246.

Figure 26:
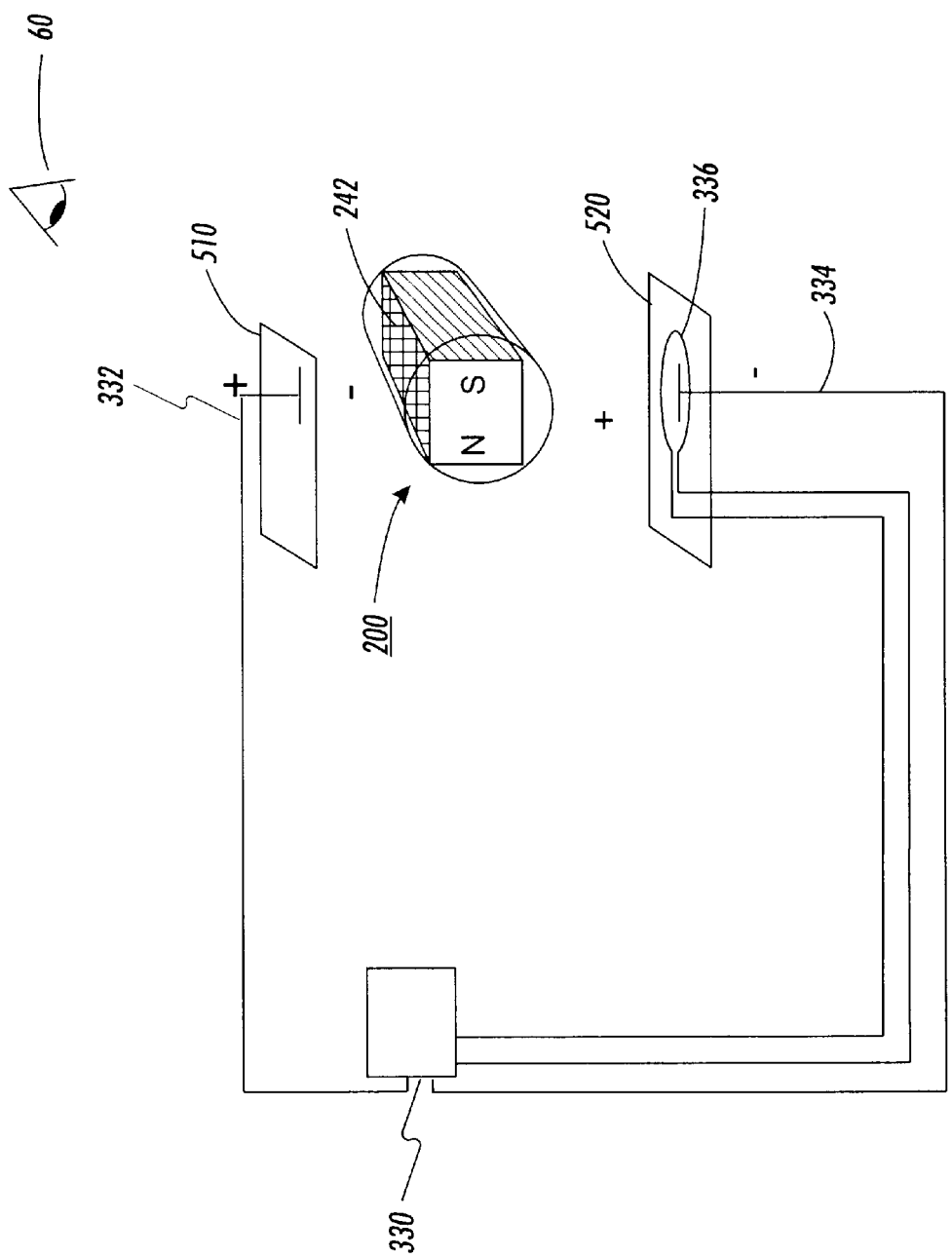
FIG. 26 depicts an addressing system and the rotatable element of FIGS. 23 and 24 in a second orientation.

FIG. 26 depicts a stable configuration of an addressing system and rotatable element 200 in one embodiment of the present invention when controller 330 operates such that first electrode 332 has a net positive charge (indicated with the "+" symbol) with respect to second electrode 334. Accordingly, a stable orientation for rotatable element 200 is one where the region of rotatable element 200 that exhibits the net negative charge when in contact with a dielectric fluid is proximal to first electrode 332, and the region of rotatable element 200 that exhibits the net positive charge when in contact with a dielectric fluid is proximal to second electrode 334. Again, one skilled in the art should appreciate that when the electric field E introduced between first electrode 332 and second electrode 334 interacts with the electric dipole p exhibited by rotatable element 200 such that the energy−E·p is greater than any residual work function that may be present associated with rotatable element 200 in rotating element sheet material, rotatable element 200 will experience a net torque in any orientation other than that depicted in FIG. 26. Again, the net torque in some instances may arise from a net monopole of rotatable element 200 interacting with the vector field in conjunction with the random fluctuations in the flow of the enabling fluid (not shown) at the surface of rotatable element 200. Accordingly, observer 60 in FIG. 26 is favorably situated to observe first aspect surface 242.

Figure 27:
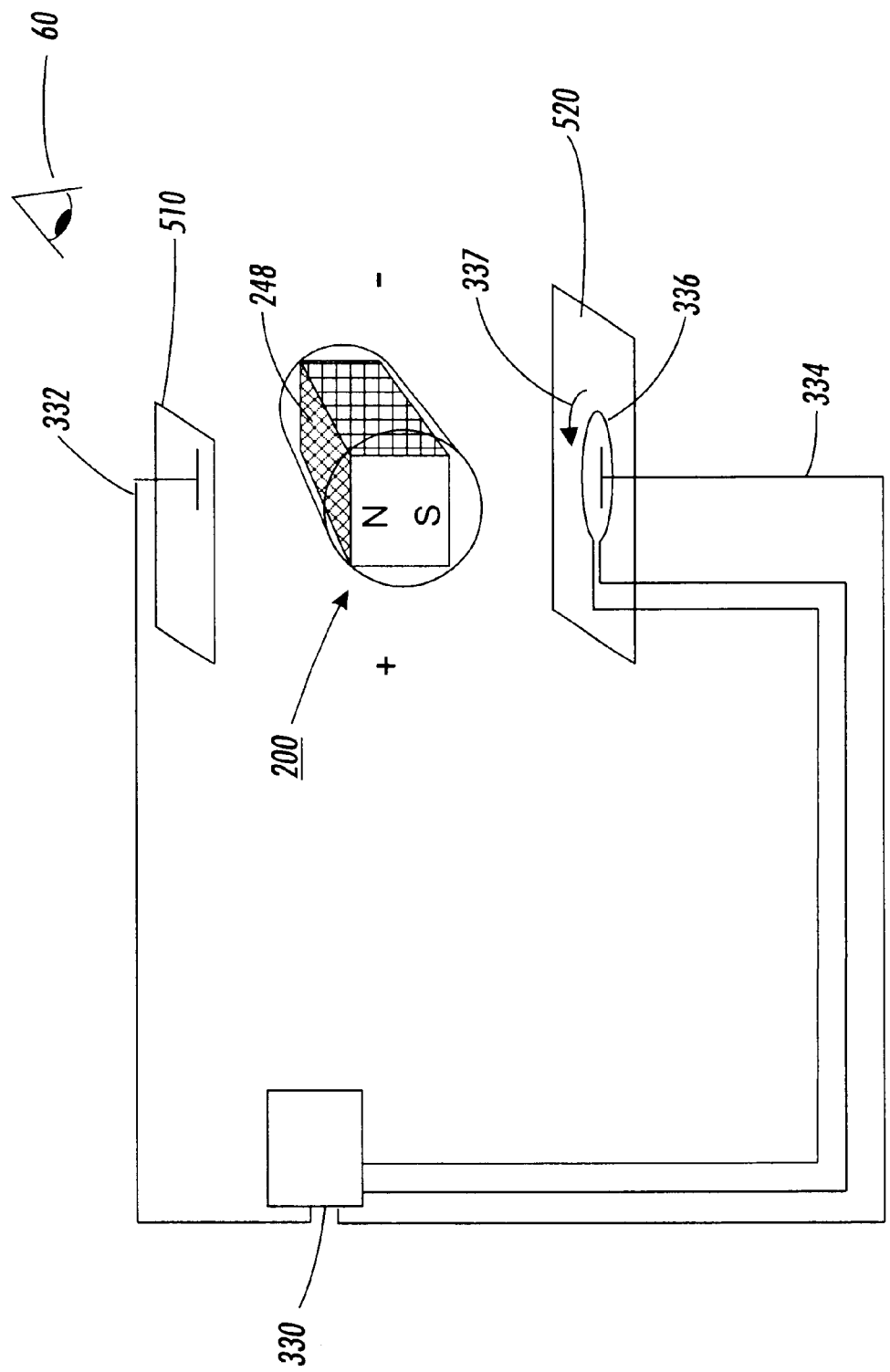
FIG. 27 depicts an addressing system and the rotatable element of FIGS. 23 and 24 in a third orientation.

FIG. 27 depicts a stable configuration of an addressing system and rotatable element 200 in one embodiment of the present invention when controller 330 operates such that a current is introduce in current loop 336 is counterclockwise from the perspective of observer 60 (arrow 337). Accordingly, a stable orientation for rotatable element 200 is one where the region of rotatable element 200 that exhibits the "S" polarity is proximal to current loop 336. One skilled in the art should appreciate that when the magnetic field B introduced above current loop 336 interacts with the magnetic dipole d exhibited by rotatable element 200 such that the energy −B·d is greater than any residual work function that may be present associated with rotatable element 200 in rotating element sheet material, rotatable element 200 will experience a net torque in any orientation other than that depicted in FIG. 27. In this instance, one skilled in the art should appreciate that the net torque may arise from the gradient nature of the magnetic field interacting with the dipole of rotatable element 200 in conjunction with the random fluctuations in the flow of the enabling fluid (not shown) at the surface of rotatable element 200. Accordingly, observer 60 in FIG. 27 is favorably situated to observe fourth aspect surface 248.

Figure 28:
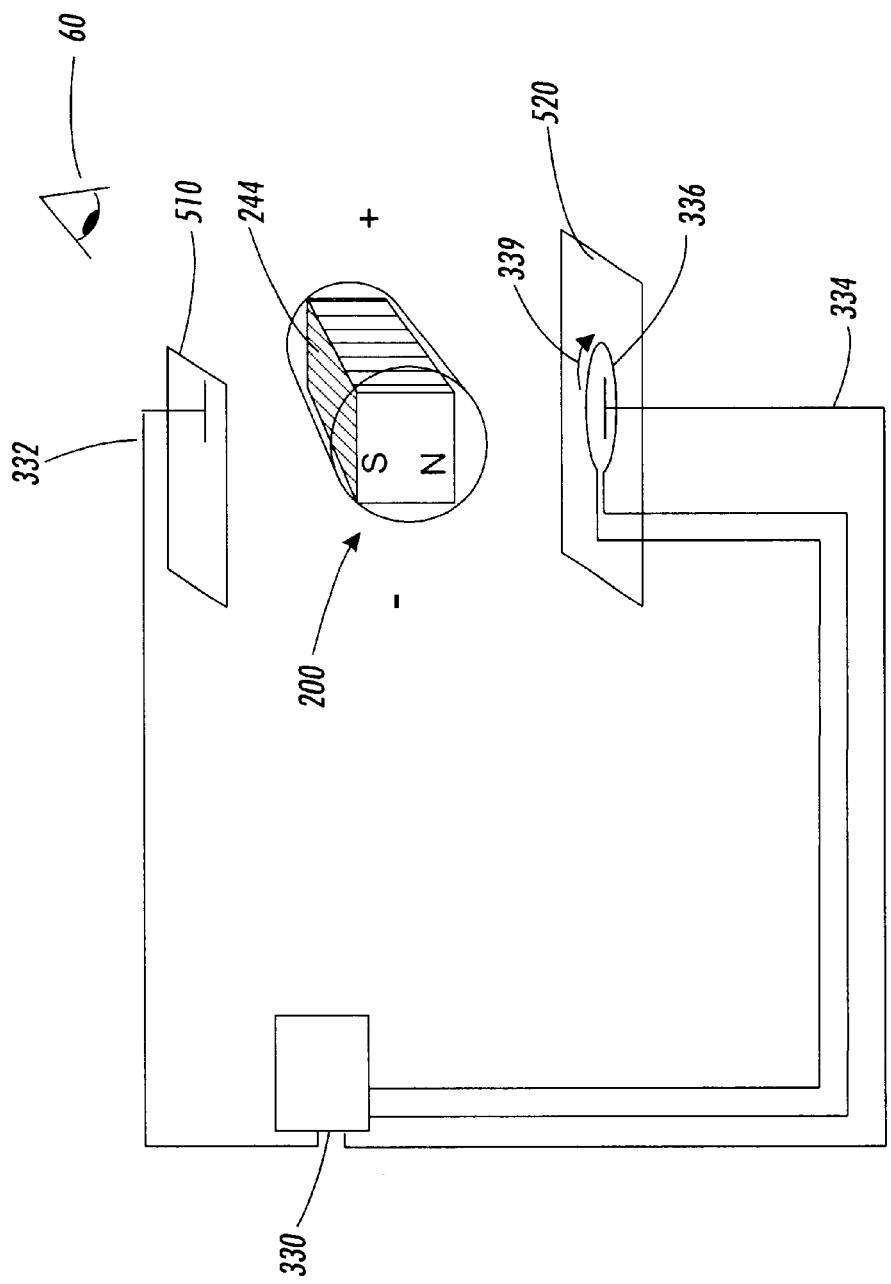
FIG. 28 depicts an addressing system and the rotatable element of FIGS. 23 and 24 in a fourth orientation.

FIG. 28 depicts a stable configuration of an addressing system and rotatable element 200 in one embodiment of the present invention when controller 330 operates such that a current is introduce in current loop 336 is clockwise from the perspective of observer 60 (arrow 339). Accordingly, a stable orientation for rotatable element 200 is one where the region of rotatable element 200 that exhibits the "N" polarity is proximal to current loop 336. One skilled in the art should appreciate that when the magnetic field B introduced above current loop 336 interacts with the magnetic dipole d exhibited by rotatable element 200 such that the energy−B·d is greater than any residual work function that may be present associated with rotatable element 200 in rotating element sheet material, rotatable element 200 will experience a net torque in any orientation other than that depicted in FIG. 28. Again, one skilled in the art should appreciate that the net torque in some instances may arise from the gradient nature of the magnetic field interacting with the dipole of rotatable element 200 in conjunction with the random fluctuations in the flow of the enabling fluid (not shown) at the surface of rotatable element 200. Accordingly, observer 60 in FIG. 28 is favorably situated to observe second aspect surface 244.

In analogy with the set of rotatable elements of the prior art depicted in FIGS. 11–13, FIGS. 29–33 depict a set of rotatable element 200 consistent with the present invention and the addressing vector fields.

Figure 29:
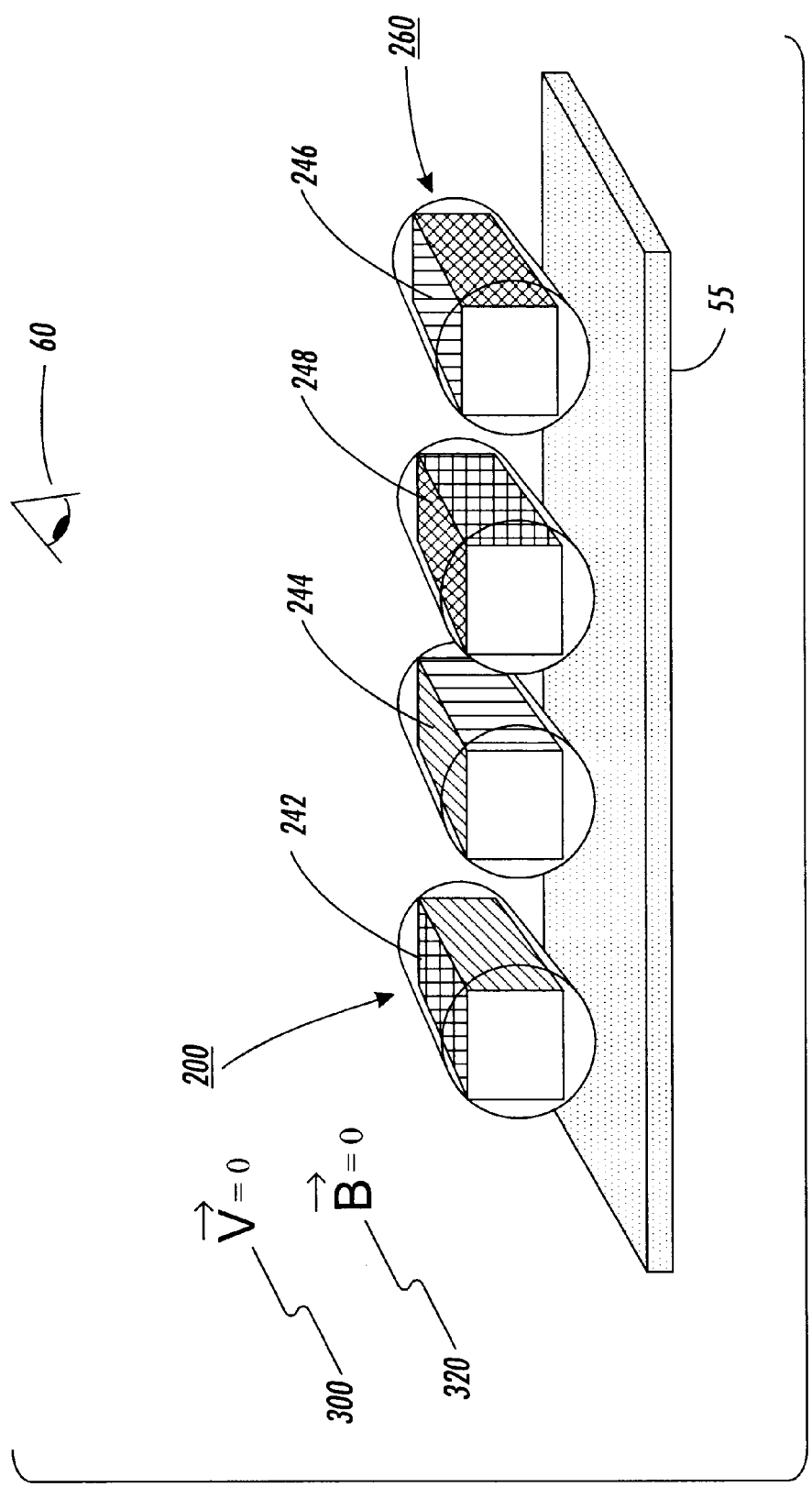
FIG. 29 depicts a set of rotatable elements from FIGS. 23 and 24 in the presence of a first vector field with zero magnitude and a second vector field with zero magnitude.

In FIG. 29, no-field set 260 depicts a subset of randomly oriented rotatable elements in the vicinity of first vector field 300 and second vector field 320 when first vector field 300 and second vector field 320 have zero magnitude. In no-field set 260, the rotatable elements have arbitrary orientations. Therefore, observer 60 in the case of no-field set 260 registers views of the combination of the surface of first aspect surface 242, second aspect surface 244, third aspect surface 246, and fourth aspect surface 248 in an unordered sequence. Infralayer 55 forms the backdrop of the aspect.

Figure 30:
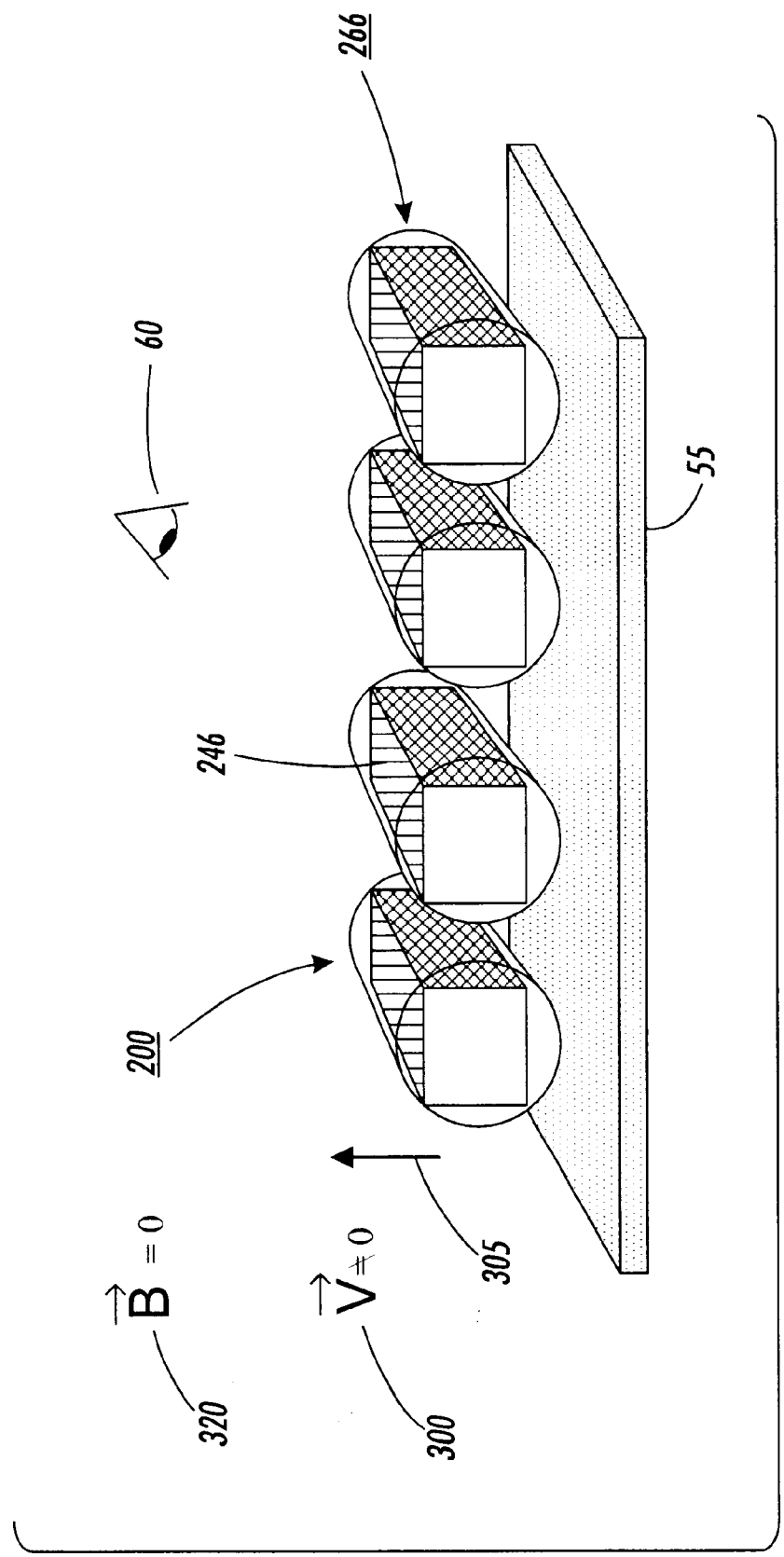
FIG. 30 depicts a set of rotatable elements from FIGS. 23 and 24 in the presence of a first vector field with nonzero magnitude and a second vector field with zero magnitude.
Figure 31:
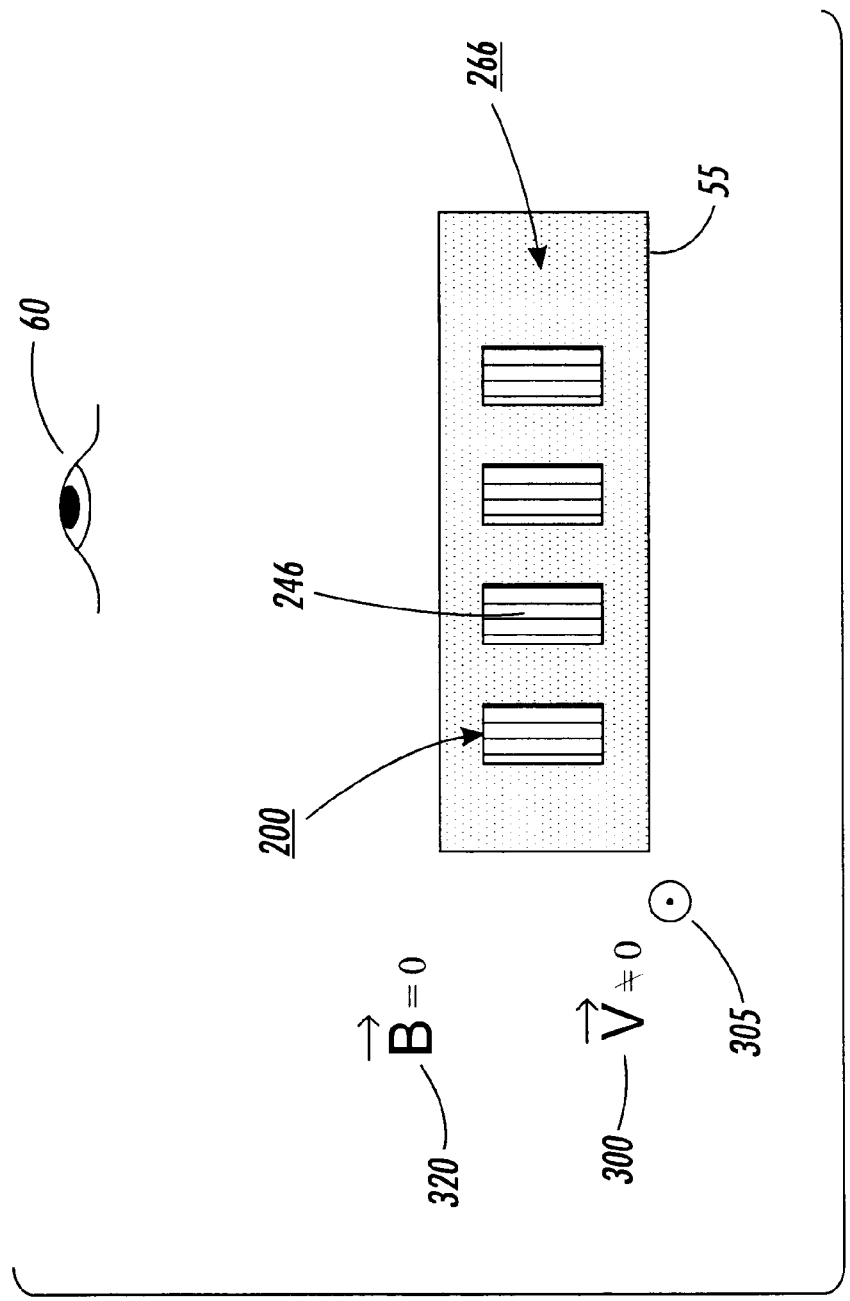
FIG. 31 depicts an alternate view of the set of rotatable elements from FIG. 30.

FIGS. 30 and 31 depict third aspect set 266 of the system introduced in FIG. 29. In third aspect set 266, observer 60 registers a coherent view of the combination of the third aspect surface 246. In third aspect set 266, all of the rotatable elements orient themselves such that third aspect surface 246 lies in the direction indicated by arrow 305, where arrow 305 indicates the direction of first vector field 300. In FIGS. 30 and 31, second vector field 320 has zero magnitude. FIG. 30 is a side view indicating the relative positions of observer 60, third aspect set 266, and infralayer 55. FIG. 31 is an alternate view of third aspect set 266 from a top perspective. In FIG. 31, the symbol ⊙ indicates an arrow directed out of the plane of the figure.

Figure 32:
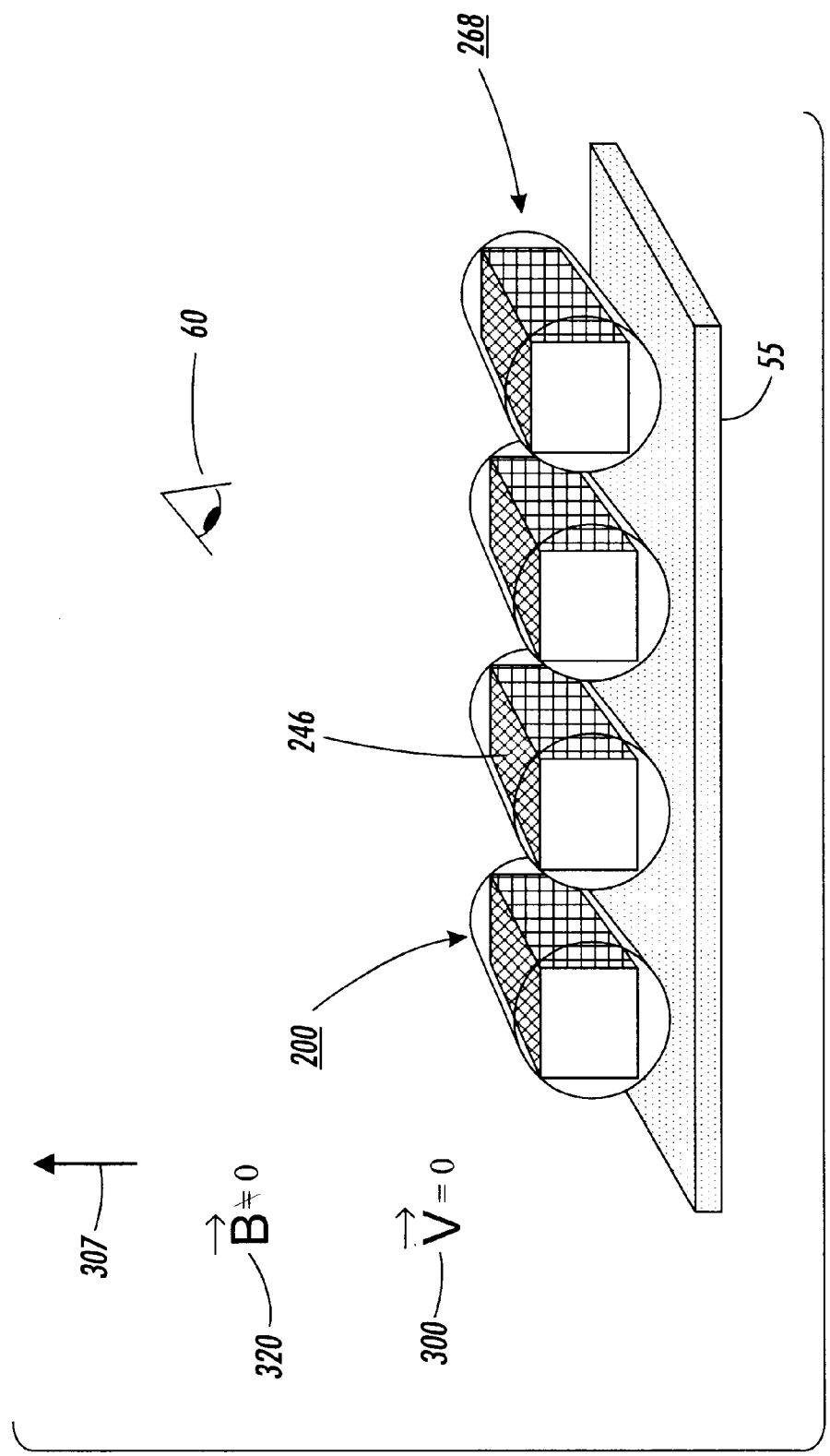
FIG. 32 depicts a set of rotatable elements from FIGS. 23 and 24 in the presence of a first vector field with zero magnitude and a second vector field with nonzero magnitude.
Figure 33:
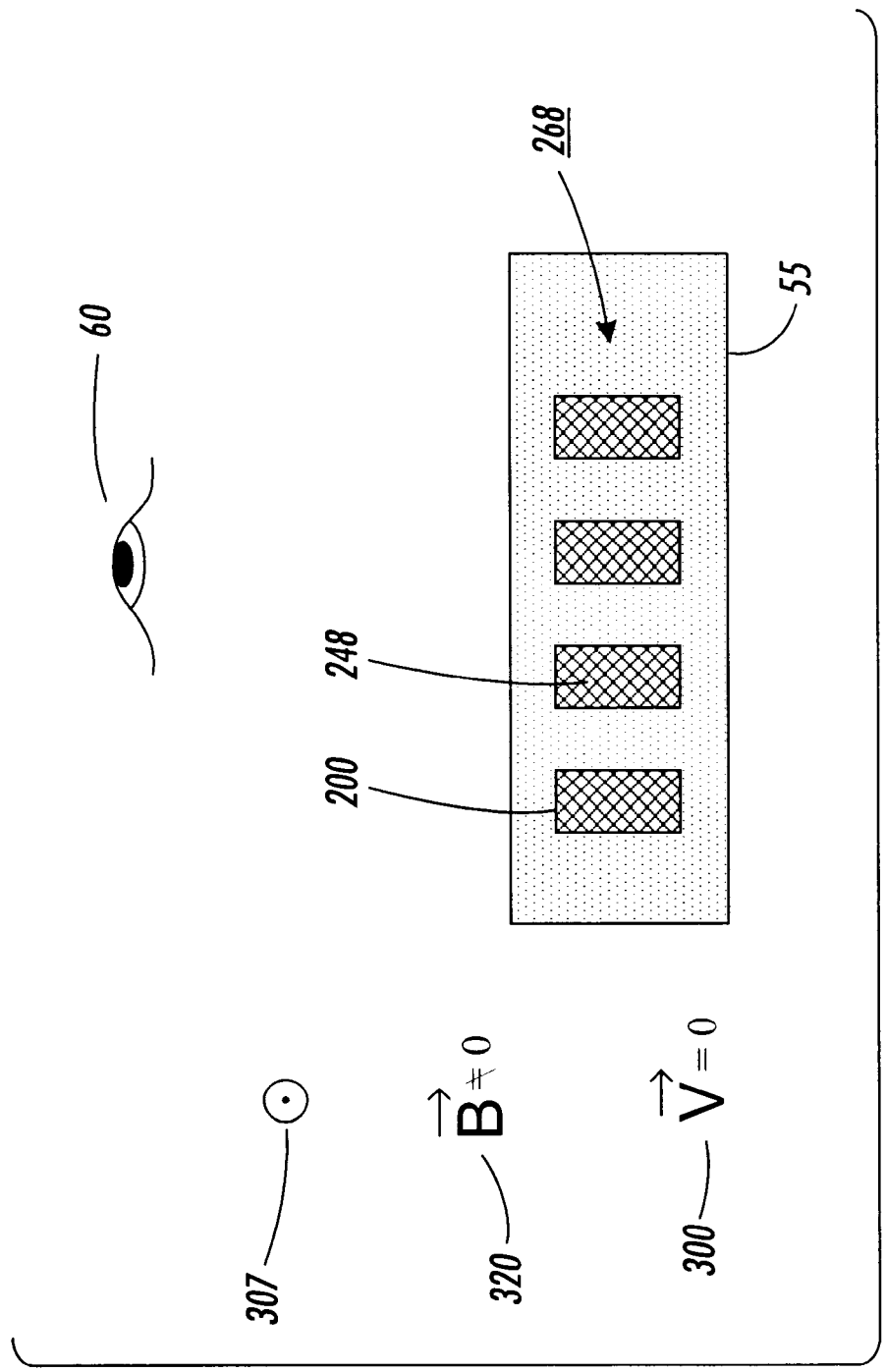
FIG. 33 depicts an alternate view of the set of rotatable elements from FIG. 32.

FIGS. 32 and 33 depict fourth aspect set 268 of the system introduced in FIG. 29. In fourth aspect set 268, observer 60 registers a coherent view of the combination of the fourth aspect surface 248. In fourth aspect set 268, all of the rotatable elements orient themselves such that fourth aspect surface 248 lies in the direction indicated by arrow 307, where arrow 307 indicates the direction of second vector field 320. In FIGS. 32 and 33, first vector field 300 has zero magnitude. FIG. 32 is a side view indicating the relative positions of observer 60, fourth aspect set 268, and infralayer 55. FIG. 33 is an alternate view of fourth aspect set 268 from a top perspective. In FIG. 33, the symbol ⊙ indicates an arrow directed out of the plane of the figure.

One skilled in the art should appreciate that third aspect set 266 and fourth aspect set 268 will maintain their aspect after applied first vector field 300 and applied second vector field 320 are removed due to the energy associated with the attraction between rotatable element 200 and the substrate structure, as, for example, cavity walls (not shown). This energy contributes, in part, to the switching characteristics and the memory capability of rotating element sheet material 50, as disclosed in U.S. Pat. No. 4,126,854, hereinabove incorporated by reference. Furthermore, one skilled in the art should appreciate that the direction of first vector field 300 or second vector field 320 may also be in the direction of infralayer 55, presenting, alternatively, first aspect surface 242 or second aspect surface 244 to observer 60.

Further still, one skilled in the art should appreciate that in order to address one region of rotating element sheet material as first aspect surface, second aspect surface, third aspect surface, or fourth aspect surface only, the plurality of parity vectors associated with the plurality of rotatable elements 200 do not need to be assembled in the same direction. This feature of the present invention occurs because the addressing fields are not required to be canted fields in order to exhibit all four aspects of rotatable element 200. Although all of the axes of rotation of the rotatable elements are preferably parallel, the parity vectors may be randomly oriented in either of one of the two available directions. Accordingly, this should allow for simpler construction of rotating element sheet material consistent with the present invention. Further still, one skilled in the art should appreciate that latching components may not be necessary, again, due to the fact that canted vector fields are not required in order to address all of the aspects.

V.C. Second Embodiment of a Rotatable Element

Figure 34:
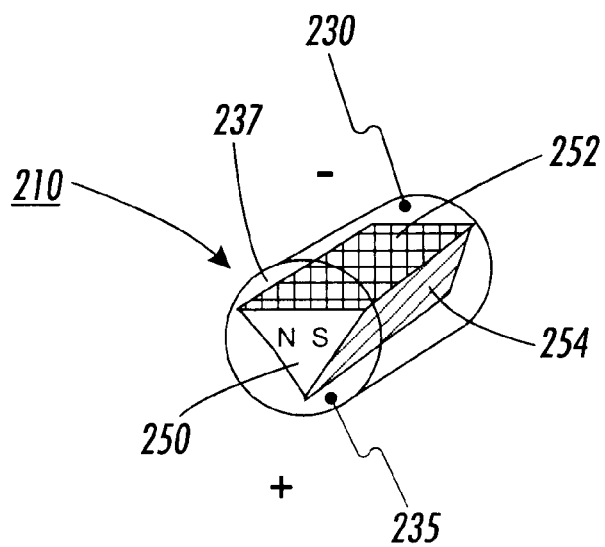
FIG. 34 depicts a second embodiment of a rotatable element of the present invention.
Figure 35:
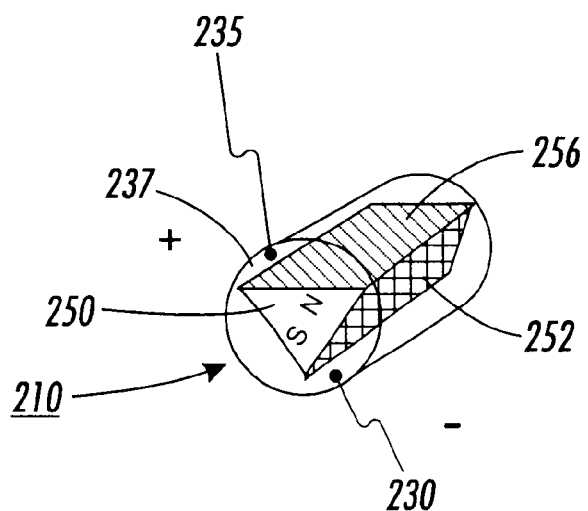
FIG. 35 depicts an alternate view of the rotatable element of FIG. 34.

Rotatable element 210 consistent with a second embodiment of the present invention is depicted in FIGS. 34 and 35. FIG. 34 depicts rotatable element 210 comprising core 250 and aspect-transparent cladding 237. Core 250 in FIGS. 34 and 35 is prism-shaped and is depicted as a triangular column. Core 250 further comprises a material that exhibits some amount of magnetism, depicted in FIGS. 34 and 35 by the notation "N" for "north magnetic polarity" and "S" for "south magnetic polarity." One skilled in the art should appreciate, however, that it is rotatable element 210 as a whole that is configured to exhibit magnetism. Accordingly, although FIGS. 34 and 35 depict core 250 as exhibiting magnetism, aspect-transparent cladding 237 may also exhibit magnetism, either in addition to core 250, or exclusively.

Figure 9:
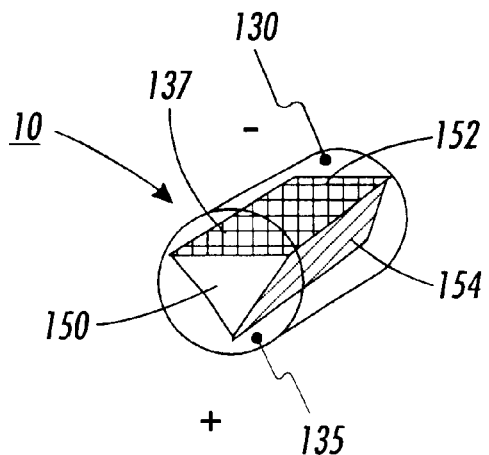
FIG. 9 depicts another rotatable element of the prior art with multivalued aspect.
Figure 10:
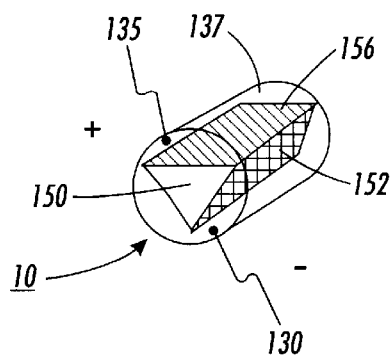
FIG. 10 depicts another perspective of the rotatable element of FIG. 9.
Figure 11:
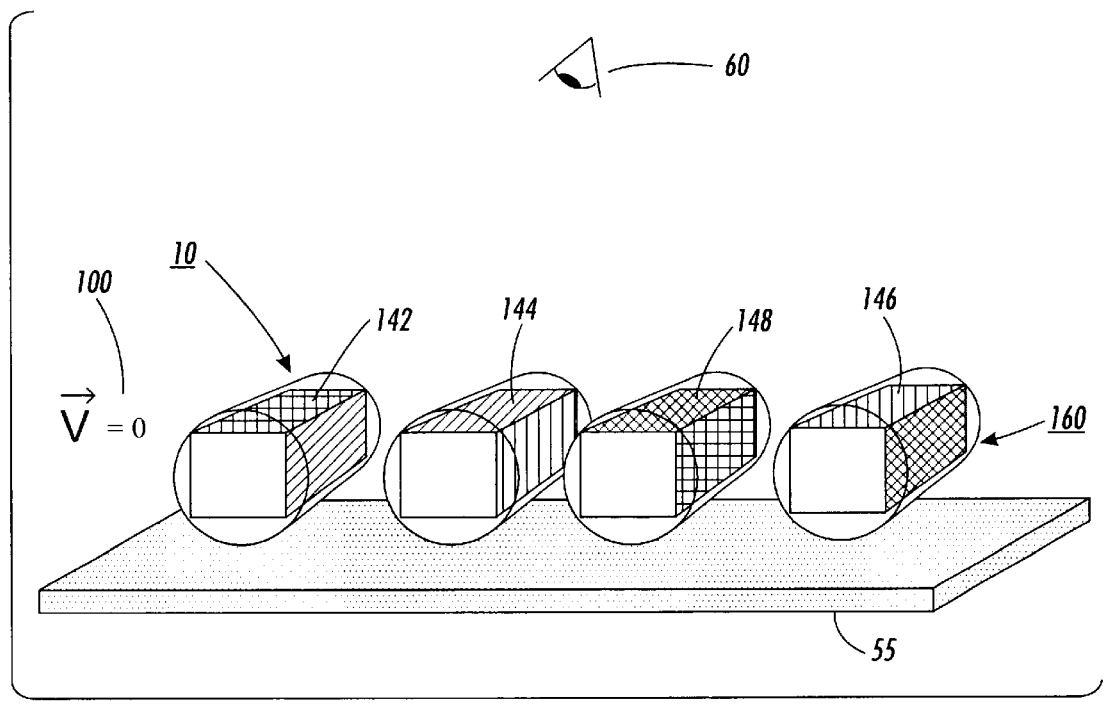
FIG. 11 depicts a set of rotatable elements from FIGS. 7 and 8 in the presence of an addressing vector field with zero magnitude.
Figure 12:
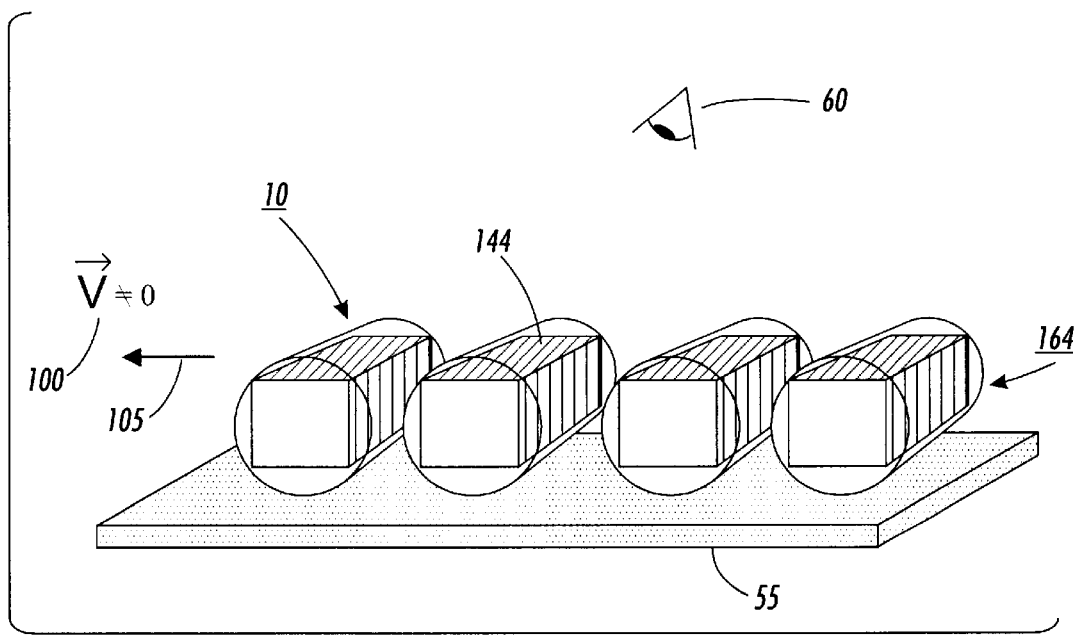
FIG. 12 depicts a set of rotatable elements from FIGS. 7 and 8 in the presence of an addressing vector field with nonzero magnitude.
Figure 13:
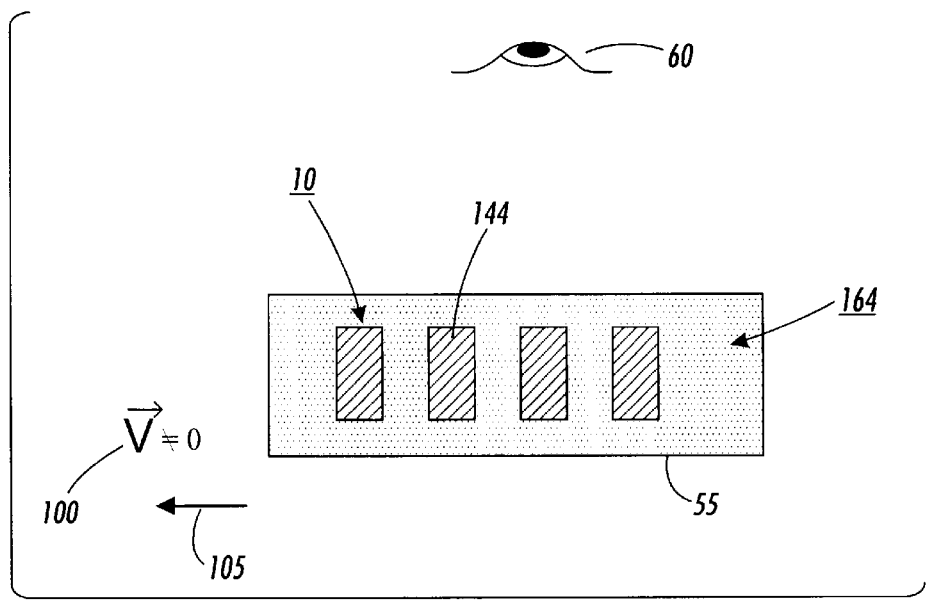
FIG. 13 is another perspective of the set of rotatable elements from FIG. 12.
Figure 14:
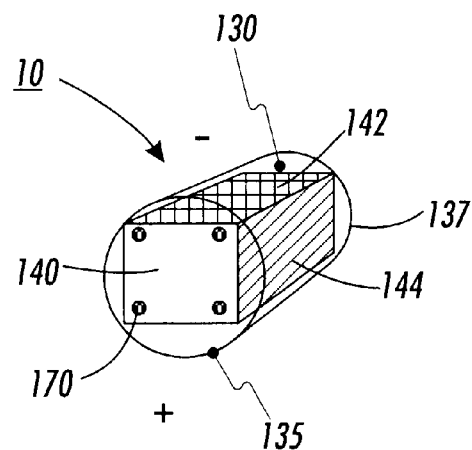
FIG. 14 depicts a rotatable element of the prior art with multivalued aspect and with latching components.
Figure 15:
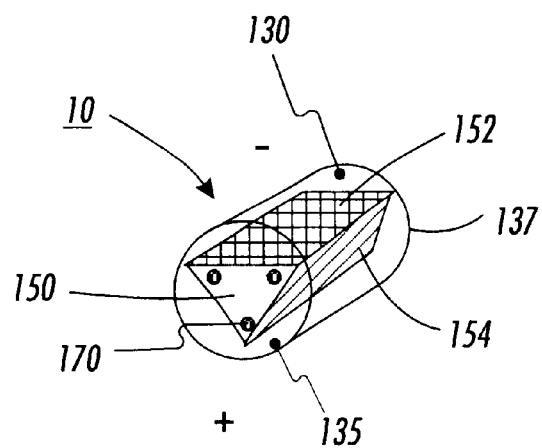
FIG. 15 depicts another rotatable element of the prior art with multivalued aspect and with latching components.
Figure 16:
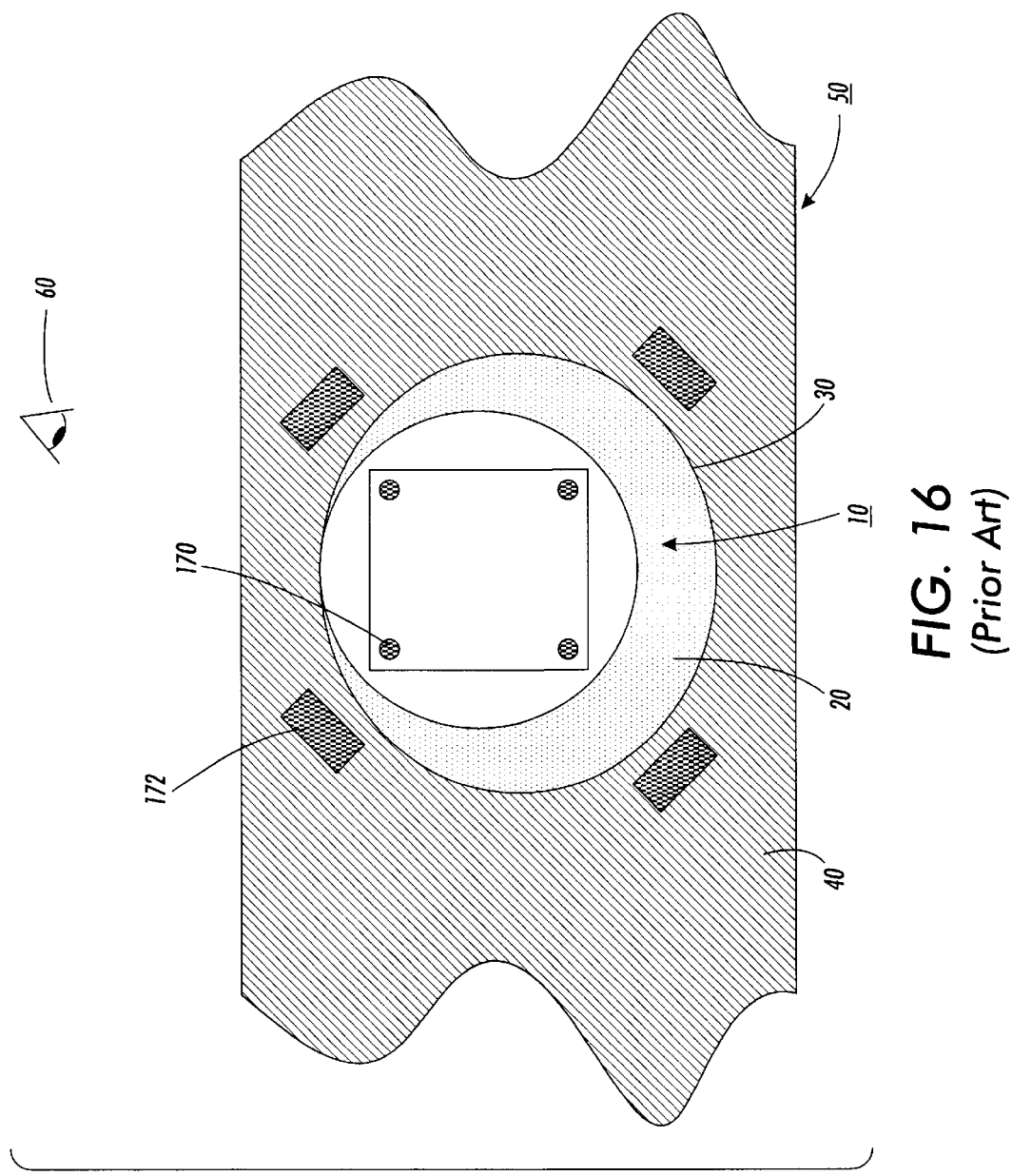
FIG. 16 depicts rotating element sheet material including the rotatable element of FIG. 14 and including sheet latching components.
Figure 17:
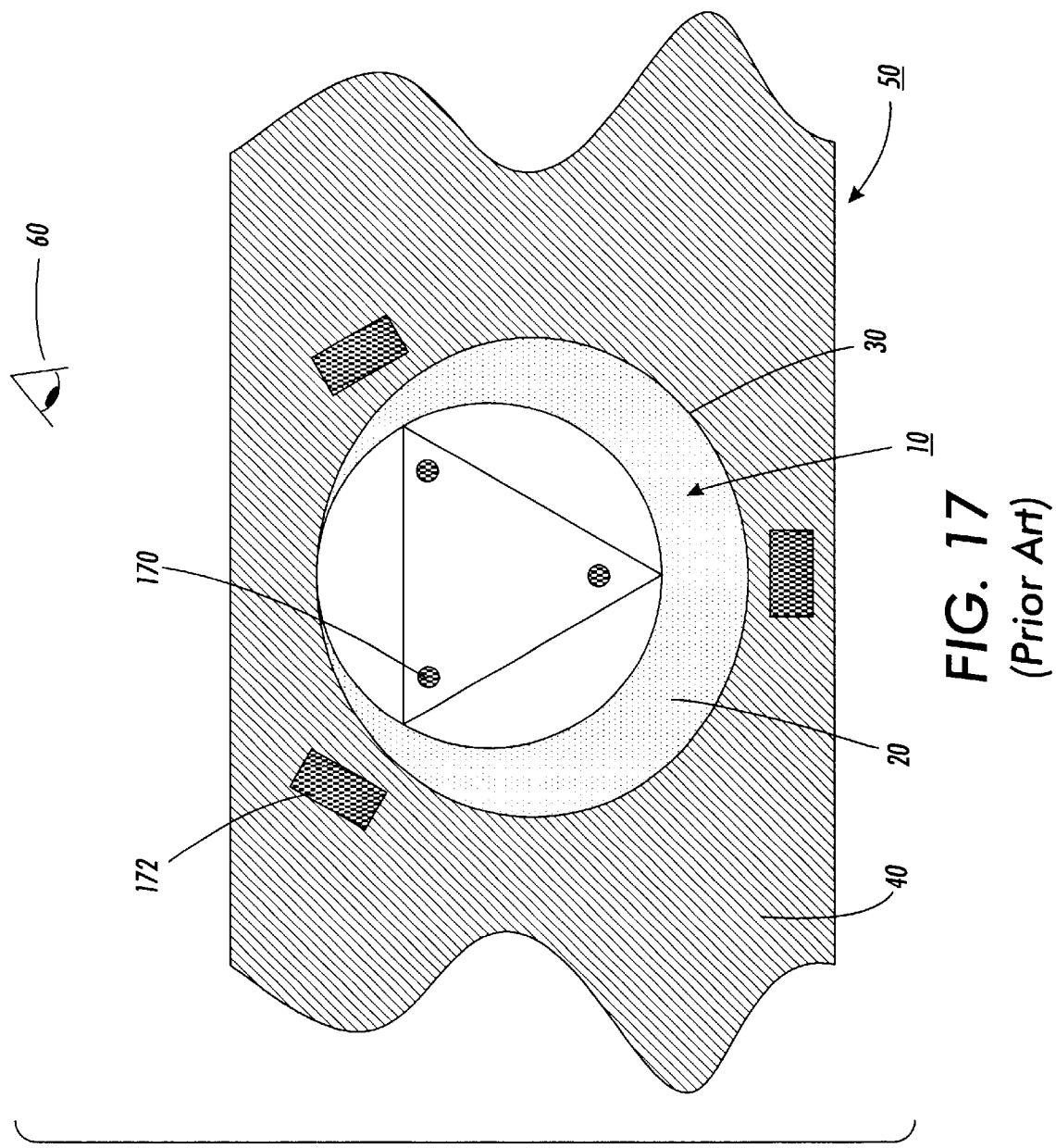
FIG. 17 depicts rotating element sheet material including the rotatable element of FIG. 15 and including sheet latching components.
Figure 18:
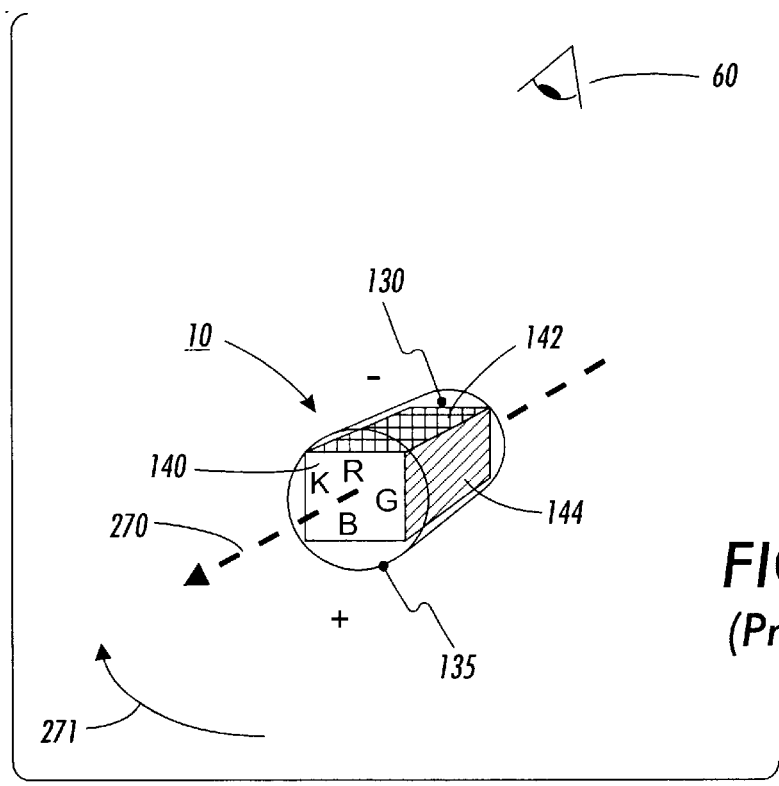
FIG. 18 depicts a multi aspect rotatable element of the prior art with a selected parity vector.
Figure 19:
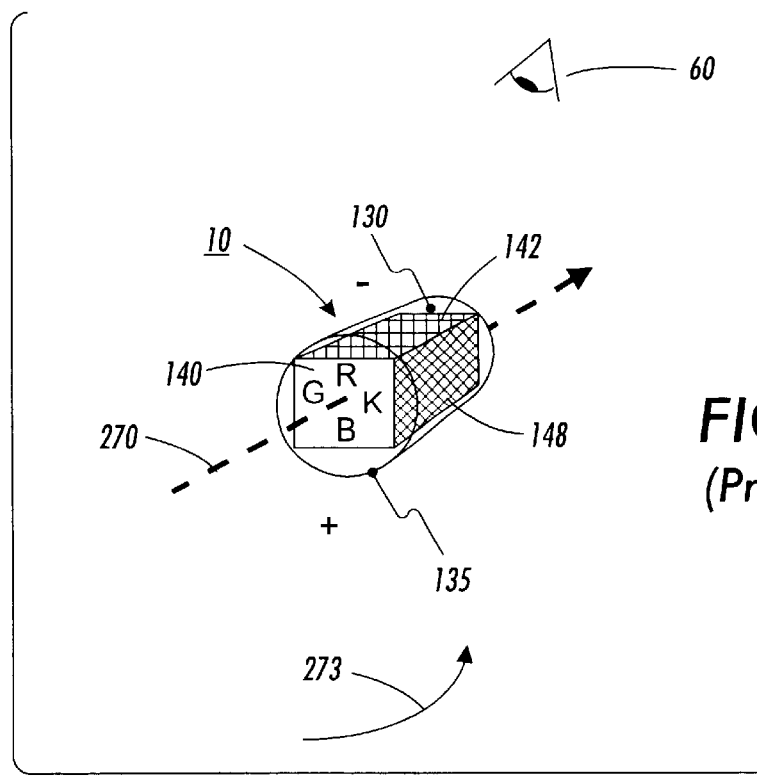
FIG. 19 depicts the rotatable element of FIG. 18 from another perspective.
Figure 20:
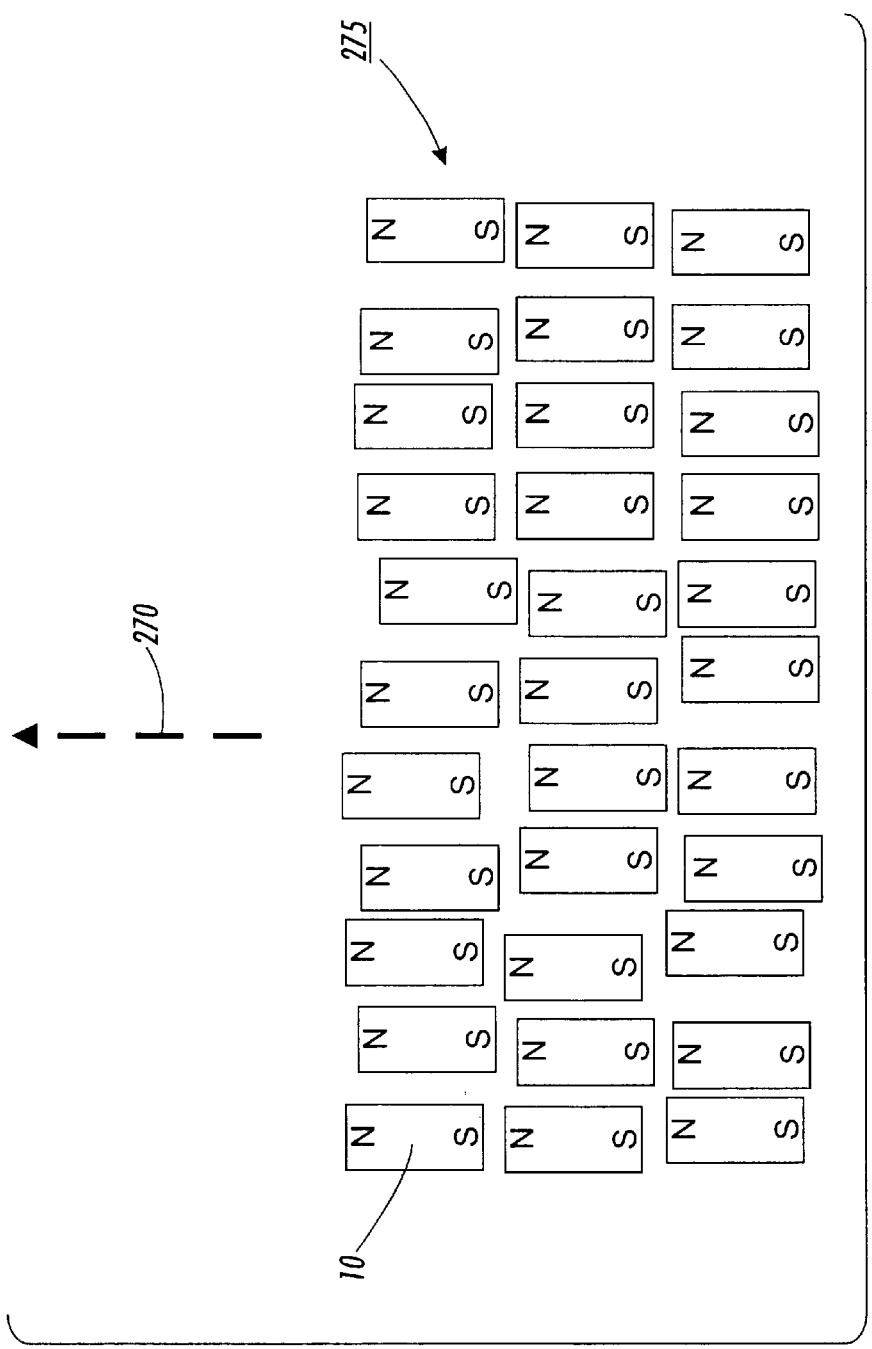
FIG. 20 depicts a method of the prior art of assembling a plurality of rotatable elements to share the same parity vector.
Figure 21:
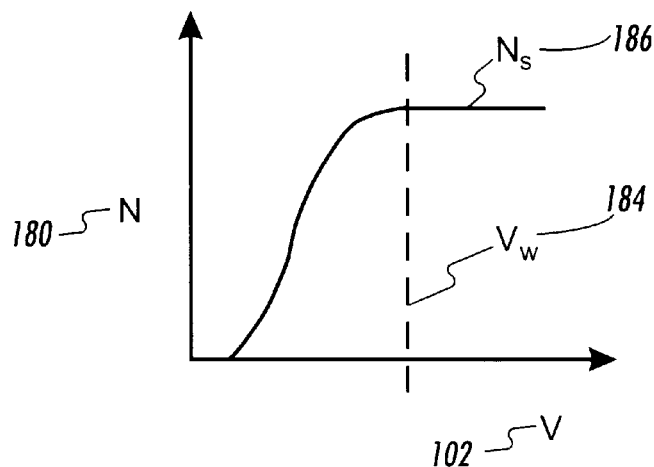
FIG. 21 is an exemplary graph of the number of rotatable elements that undergo a change in orientation as a function of applied vector field.
Figure 22:
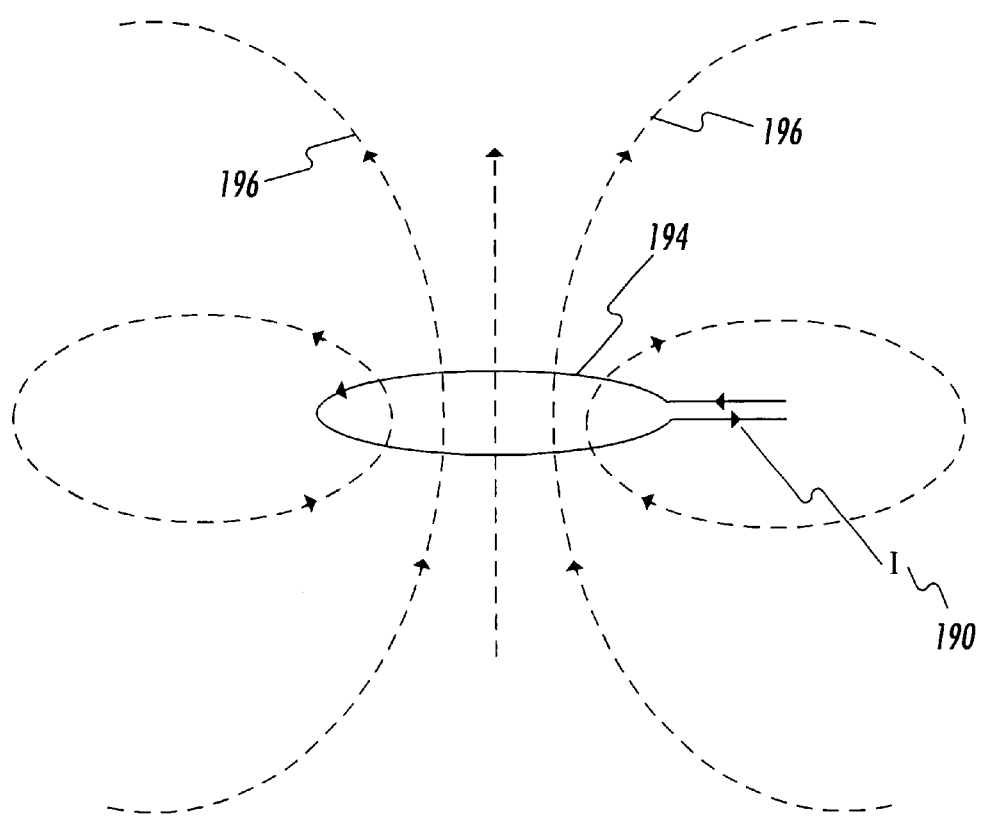
FIG. 22 depicts one manner of the prior art of introducing a magnetic field to a region.

Core 250 in FIGS. 34 and 35 is further configured to exhibit at most three aspects. FIG. 34 depicts rotatable element 210 from a perspective where first aspect surface 252 and second aspect surface 254 are illustrated. FIG. 35 depicts rotatable element 210 from a perspective where third aspect surface 256 and first aspect surface 252 are illustrated. As described earlier with respect to rotatable element 10 of FIGS. 9 and 10, the surface of aspect-transparent cladding 237 in FIGS. 34 and 35 above first aspect surface 242 has first coating 230 at a first Zeta potential, and the surface of aspect-transparent cladding 237 above the apex where third aspect surface 256 meets second aspect surface 254 has second coating 235 at a second Zeta potential such that first coating 230 has a net negative charge, "−," with respect to second coating 235 when rotatable element 210 is in contact with a dielectric fluid (not shown).

Suitable optically transparent materials for aspect-transparent cladding 237 include the polycarbonate polymers, the acrylic polymers and the polyolefin polymers, such as Polywax 1000 by the Baker Petrolite Corp. and the various grades of TPX by the Mitsui Petrochemical Industries, Ltd. These would be used in combinations, since each can be expected to have a different Zeta potential in contact with the enabling fluid. These materials are also generally suitable for the fabrication of the other parts of rotatable element 210, as described in pending U.S. patent application Ser. No. 09/427,656, hereinabove incorporated by reference. A suitable magnetic pigment which may be incorporated into rotatable element 210 is magnetic pigment type 031182 by Wright Industries, Brooklyn, N.Y., either alone or in conjunction with other pigments known in the art, such as AKER CHEMICAL Cresyl violet blue, BAKER CHEMICAL Rhodamine 6G, DUPONT Rhodamine BI, DUPONT Spirit Blue NS, DUPONT Victoria Blue B base, ALLIED CHEMICALS Iosol Blue, EASTMAN Acridine orange, CALCO OIL blue N, and CALCO OIL black, DUPONT R900 titanium dioxide, FERRO 6331 black pigment, CABOT MOGUL L carbon black, and CABOT MONARCH 1000 carbon black.

One skilled in the art should appreciate that rotatable element 210 may also be fabricated without aspect-transparent cladding 237. Accordingly, rotatable element 210 may simply comprise a substantially cylindrical core with a suitable choice of coatings or material in order to present three aspects to a favorably situated observer.

Furthermore, the magnetism that is exhibited by rotatable element 210 is configured such that the first polarity, for example "N," corresponds to the region of rotatable element 210 where third aspect surface 256 may be viewed through aspect transparent cladding 237; and the second polarity, for example "S," corresponds to the region of rotatable element 210 where second aspect surface 254 may be viewed through aspect transparent cladding 237. Accordingly, rotatable element 210 consistent with one embodiment of the present invention is configured to exhibit both an electric dipole and a magnetic dipole when rotatable element 200 is in contact with a dielectric fluid (not shown), and where one polarity of the electric dipole and both polarities of the magnetic dipole are correlated with one aspect surface of the three aspect surfaces of core 250 within aspect-transparent cladding 237.

Figure 36:
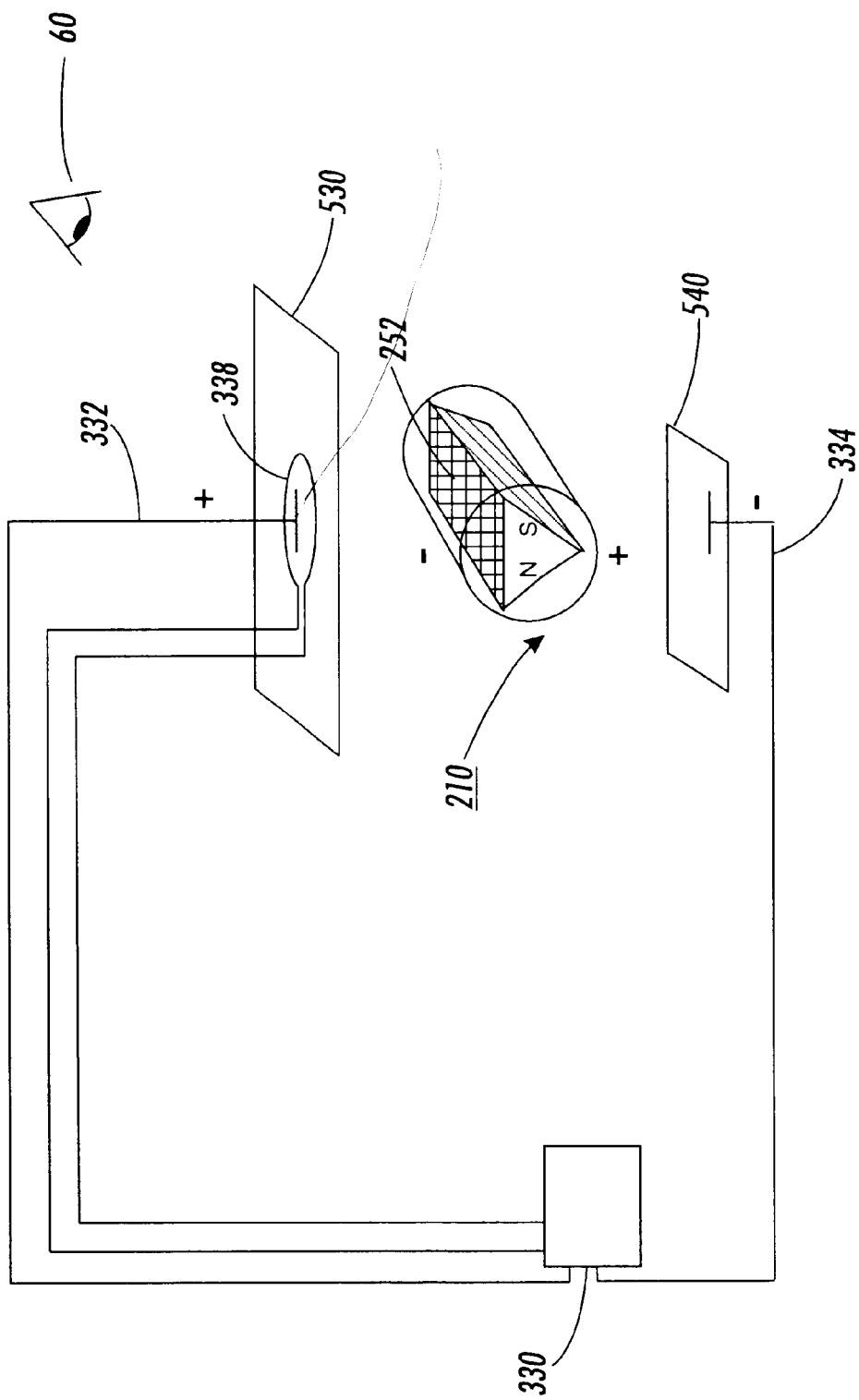
FIG. 36 depicts an addressing system and the rotatable element of FIGS. 34 and 35 in a first orientation.
Figure 37:
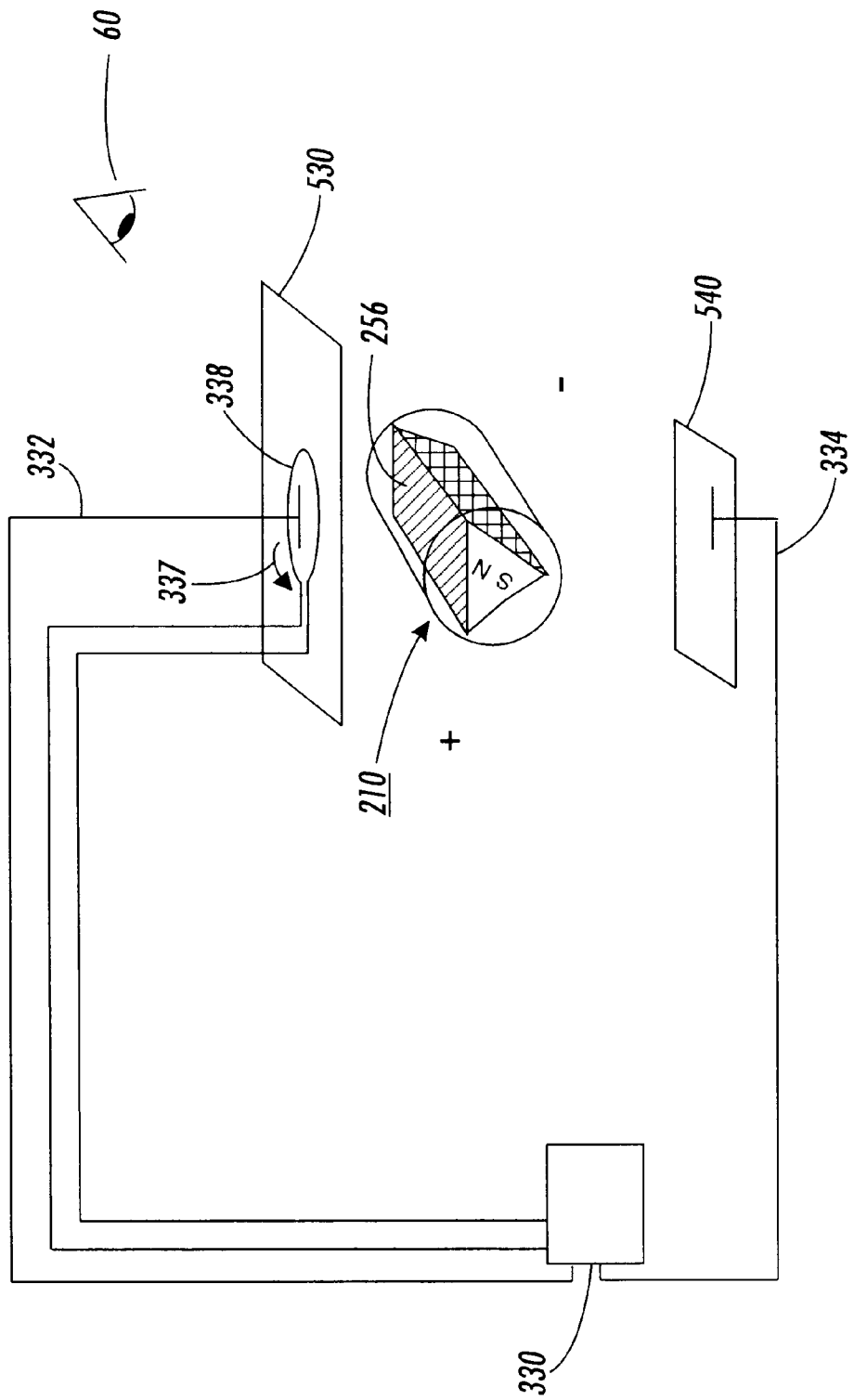
FIG. 37 depicts an addressing system and the rotatable element of FIGS. 34 and 35 in a second orientation.
Figure 38:
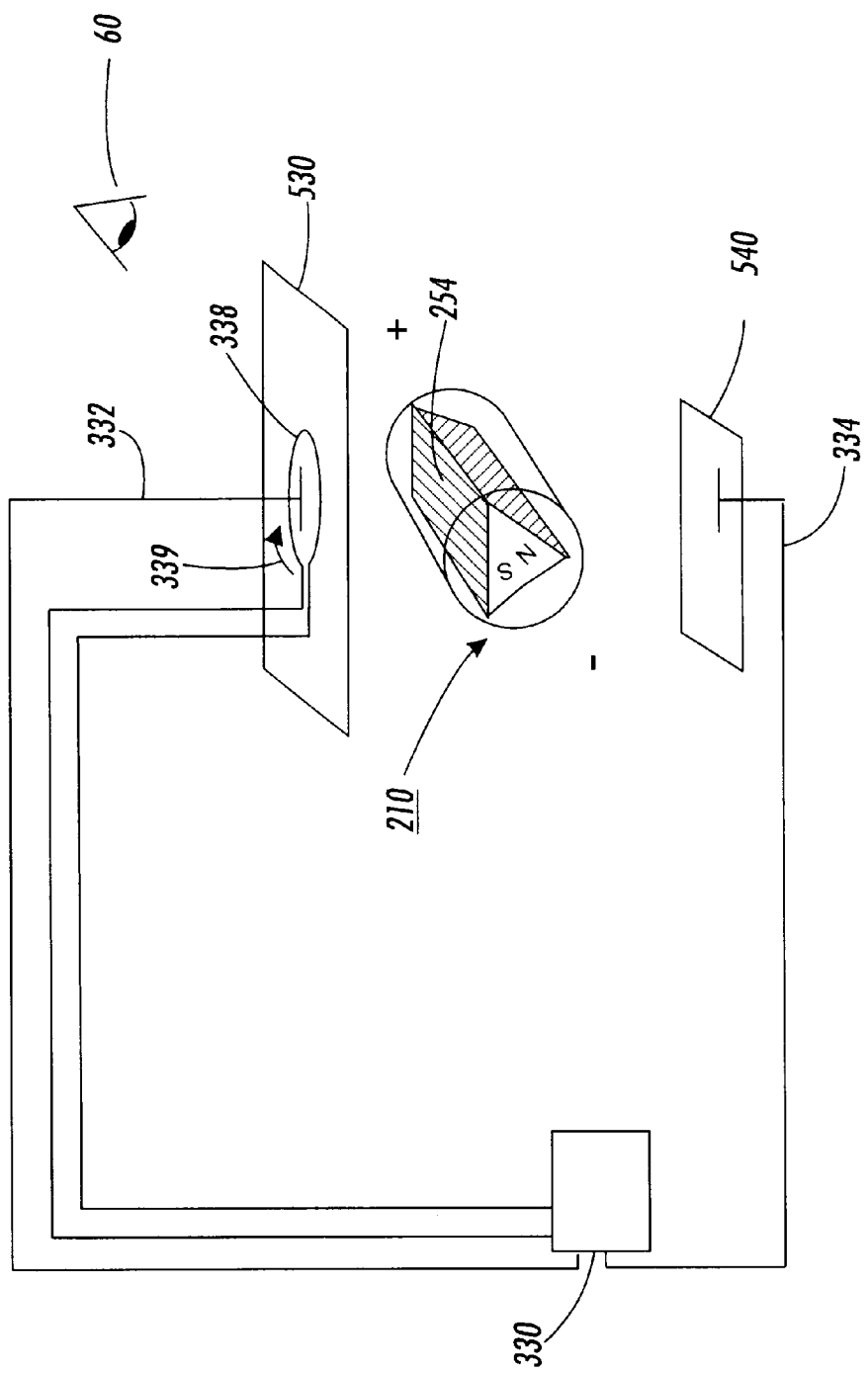
FIG. 38 depicts an addressing system and the rotatable element of FIGS. 34 and 35 in a third orientation.

Rotatable element 210 and an addressing system consistent with the second embodiment of the present invention and illustrating three stable orientations of rotatable element 210 are depicted in FIGS. 36–38.

The addressing system of FIGS. 36–38 comprises controller 330, first electrode 332 and current loop 338 within first overlay 530, and second electrode 334 within second overlay 540. First overlay 530 and second overlay 540 are configured to lie on either side of the substrate (not shown) of the rotating element sheet material. Accordingly, rotatable element 210 will lie within the region influenced by first electrode 332, second electrode 334 and current loop 338. For exemplary purposes only, current loop 338 in FIG. 36 is depicted above rotatable element 210 (that is, between observer 60 and rotatable element 210). Controller 330 is configured to introduce, either selectively or together, an electric polarity between first electrode 332 and second electrode 334, and a current through current loop 338. One skilled in the art should appreciate that the electric polarity between first electrode 332 and second electrode 334 may be such that first electrode 332 exhibits a net negative charge with respect to second electrode 334, or the electric polarity between first electrode 332 and second electrode 334 may be such that first electrode 332 exhibits a net positive charge with respect to second electrode 334. One skilled in the art should further appreciate that the current through current loop 338 may be such that it travels in a clockwise manner or in a counterclockwise manner (from a given perspective).

FIG. 36 depicts a stable configuration of an addressing system and rotatable element 210 in one embodiment of the present invention when controller 330 operates such that first electrode 332 has a net positive charge (indicated with the "+" symbol) with respect to second electrode 334. Accordingly, a stable orientation for rotatable element 210 is one where the region of rotatable element 210 that exhibits the net negative charge when in contact with a dielectric fluid is proximal to first electrode 332, and the region of rotatable element 210 that exhibits the net positive charge when in contact with a dielectric fluid is proximal to second electrode 334. Again, one skilled in the art should appreciate that when the electric field E introduced between first electrode 332 and second electrode 334 interacts with the electric dipole p exhibited by rotatable element 210 such that the energy−E·p is greater than any residual work function that may be present associated with rotatable element 210 in rotating element sheet material, rotatable element 210 will experience a net torque in any orientation other than that depicted in FIG. 36. The net torque in some instances may arise from a net monopole of rotatable element 210 interacting with the vector field in conjunction with the random fluctuations in the flow of the enabling fluid (not shown) at the surface of rotatable element 210. Accordingly, observer 60 in FIG. 36 is favorably situated to observe first aspect surface 252.

FIG. 37 depicts a stable configuration of an addressing system and rotatable element 210 in one embodiment of the present invention when controller 330 operates such that a current is introduced in current loop 338 that is counter-clockwise from the perspective of observer 60 (arrow 337). Accordingly, a stable orientation for rotatable element 210 is one where the region of rotatable element 210 that exhibits the "N" polarity is proximal to current loop 338. One skilled in the art should appreciate that when the magnetic field B introduced above current loop 338 interacts with the magnetic dipole d exhibited by rotatable element 210 such that the energy −B·d is greater than any residual work function that may be present associated with rotatable element 210 in rotating element sheet material, rotatable element 210 will experience a net torque in any orientation other than that depicted in FIG. 37. In this instance, one skilled in the art should appreciate that the net torque may arise from the gradient nature of the magnetic field interacting with the dipole of rotatable element 210 in conjunction with the random fluctuations in the flow of the enabling fluid (not shown) at the surface of rotatable element 210. Accordingly, observer 60 in FIG. 37 is favorably situated to observe third aspect surface 256.

FIG. 38 depicts a stable configuration of an addressing system and rotatable element 210 in one embodiment of the present invention when controller 330 operates such that a current is introduce in current loop 338 is clockwise from the perspective of observer 60 (arrow 339). Accordingly, a stable orientation for rotatable element 210 is one where the region of rotatable element 210 that exhibits the "N" polarity is proximal to current loop 338. One skilled in the art should appreciate that when the magnetic field B introduced above current loop 338 interacts with the magnetic dipole d exhibited by rotatable element 210 such that the energy−B·d is greater than any residual work function that may be present associated with rotatable element 210 in rotating element sheet material, rotatable element 210 will experience a net torque in any orientation other than that depicted in FIG. 38. Again, one skilled in the art should appreciate that the net torque in some instances may arise from the gradient nature of the magnetic field interacting with the dipole of rotatable element 210 in conjunction with the random fluctuations in the flow of the enabling fluid (not shown) at the surface of rotatable element 210. Accordingly, observer 60 in FIG. 38 is favorably situated to observe second aspect surface 254.

Again, one skilled in the art should appreciate that latching components may not be necessary, due to the fact that canted vector fields are not required in order to address all of the aspects.

V.D. Assembling Rotating Element Sheet Material

Figure 39:
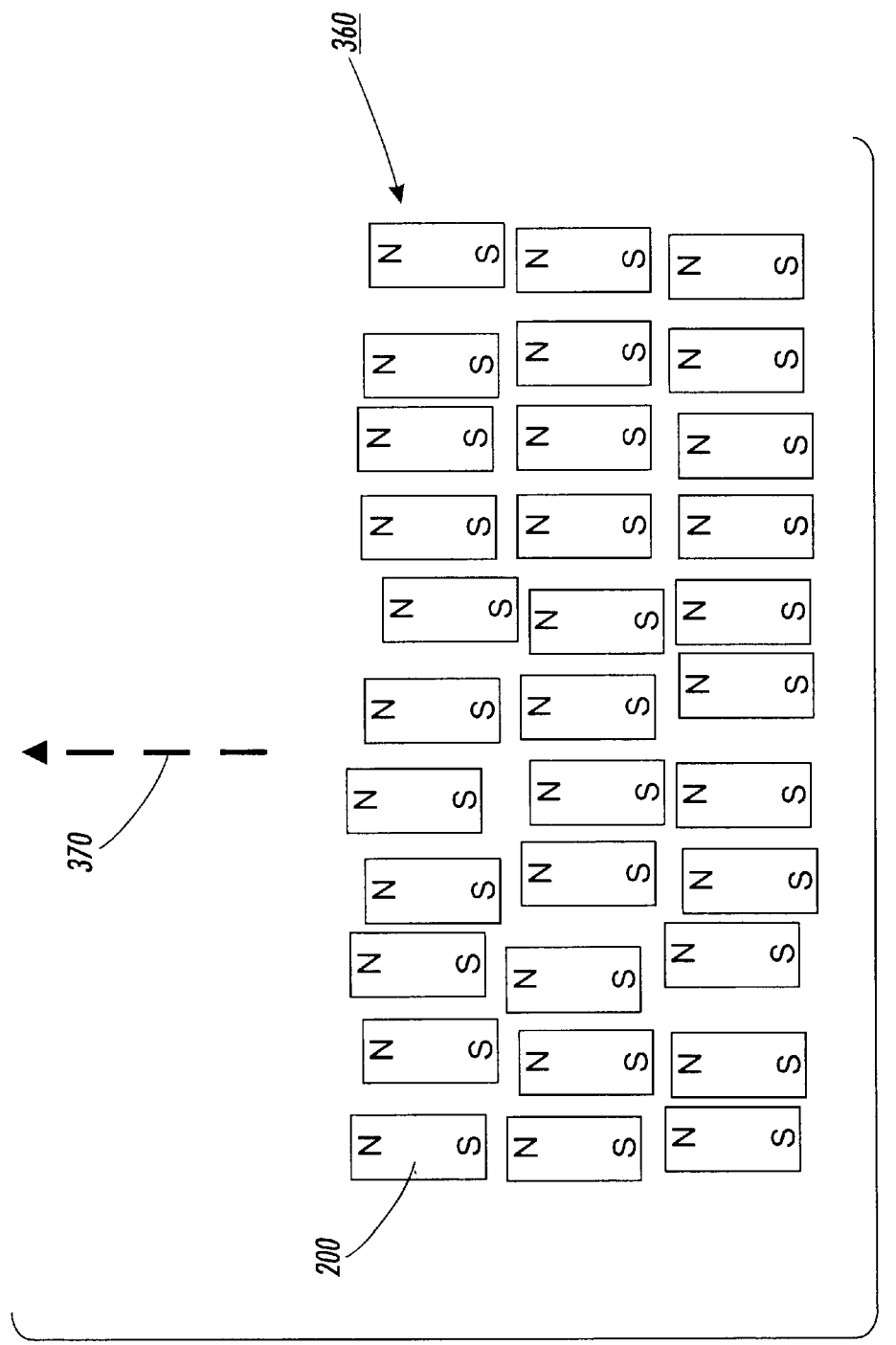
FIG. 39 depicts a set of rotatable elements consistent with a first step of a method of the present invention for preparing the rotatable elements for addressing.

A method of fabricating rotating element sheet material in one embodiment of the present invention preferably begins by assembling the rotating element sheet material by any method known in the art, as for example, those methods discussed in U.S. Pat. No. 5,904,790, hereinabove incorporated by reference. A particular advantage of the rotatable elements of the present invention is that they exhibit residual magnetism. For example, rotatable elements with magnetic core components have previously been taught in U.S. Pat. No. 5,904,790, hereinabove incorporated by reference. The magnetic core components of the rotatable elements of U.S. Pat. No. 5,904,790, however, were configured to exhibit a residual magnetic field in the direction of a parity vector. This is depicted in FIG. 39. Accordingly, a method of fabricating rotatable elements and rotating element sheet material consistent with the present invention may begin by assembling rotating element sheet material as taught in U.S.

Figure 40:
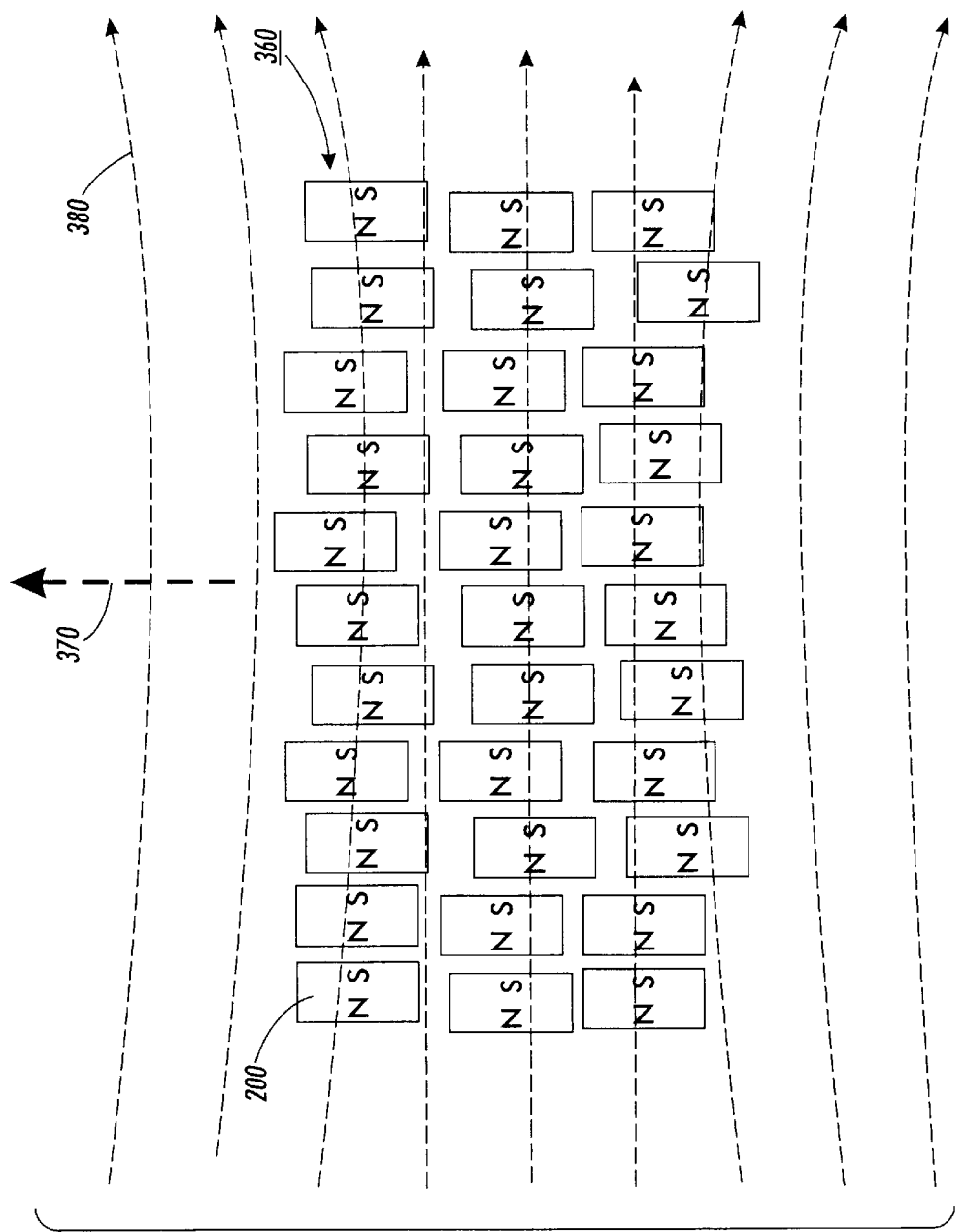
FIG. 40 depicts a set of rotatable elements and an external field consistent with a second step of a method of the present invention for preparing the rotatable elements for addressing.

Pat. No. 5,904,790. By a suitable choice of material for the magnetized core component of the rotatable element, one may cause the magnetic polarity of the rotatable elements to re-orient in a direction perpendicular to the axis of rotation. This is depicted in FIG. 40. The plurality 360 of rotatable elements 200 are assembled initially to exhibit a polarity along the axis of rotation. By suitable manipulation, the rotatable elements may be allowed to self-order such that they all share the same direction for the polarity vector 370. The rotatable elements are then exposed to an electric field perpendicular to the parity vector, in order to orient all of the rotatable elements such that they exhibit the same aspect to a favorably situated observer. The introduction of magnetic field 380 at a suitably high level and in a direction perpendicular to both the external electric field and the parity vector will cause rotatable elements 200 to become remagnetized in a direction perpendicular to the parity vector and to the direction of the external electric field.

V.E. Fabrication of Rotatable Elements

Figure 41:
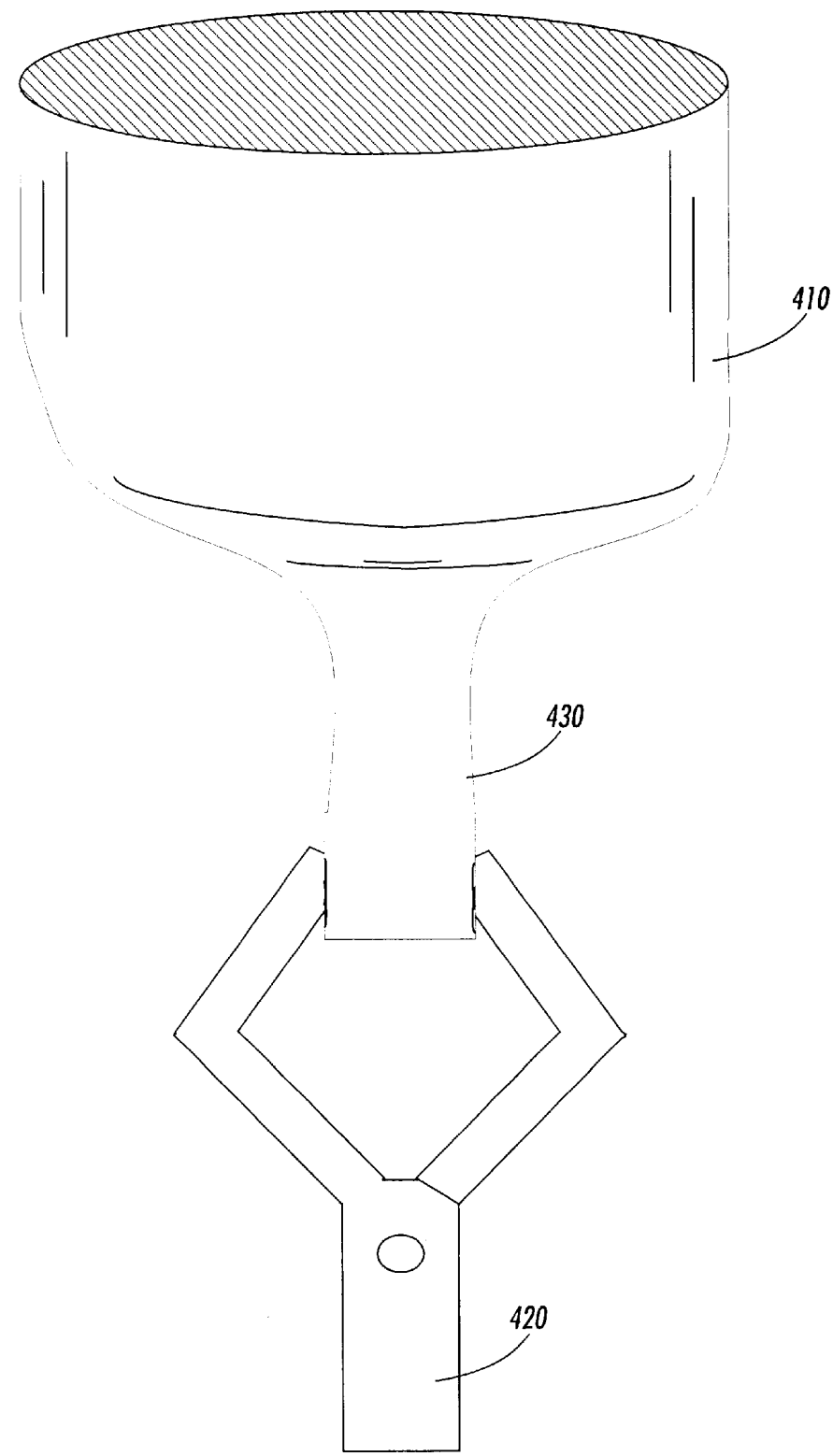
FIG. 41 depicts a method of fabricating rotatable elements consistent with the present invention including a filament tool and a macroscopic rotatable element.

Further still, rotatable element 200 or rotatable element 210 may be fabricated by the technique described in U.S. Pat. No. 5,904,790, herein incorporated by reference. FIG. 41 depicts such a manner of fabricating rotatable elements. Filament tool 420 grasps or otherwise pulls a portion of macroscopic rotatable element 410 into filament 430. Filament 430 may then be chopped to form rotatable elements of the appropriate dimensions. It is important that the particular glass or plastics chosen to construct the macroscopic rotatable element 410 be solid at room temperature, become viscous at elevated temperatures without undergoing decomposition, and that all the materials chosen have similar viscosity/temperature curves. After assembly of the macroscopic rotatable element 410, filaments 430 can be pulled from the macroscopic rotatable element 410 as shown in FIG. 41. The macroscopic rotatable element 410 may be heated at one end by a heater. A filament tool 420 may be attached at the heated end of the macroscopic rotatable element 410 to draw filaments 430 from the macroscopic rotatable element 410. The filaments 430 retain the characteristics of the macroscopic rotatable element 410 they are drawn from. This technique is well known and used in the production of glass fibers for fiber optic bundles and channel electron multipliers. Once the filaments 430 have been drawn and cooled they can be stored and used for production of rotating element sheet material.

Alternate processes for producing filaments 430 are also possible such as using injection molding or extrusion techniques.

Figure 42:
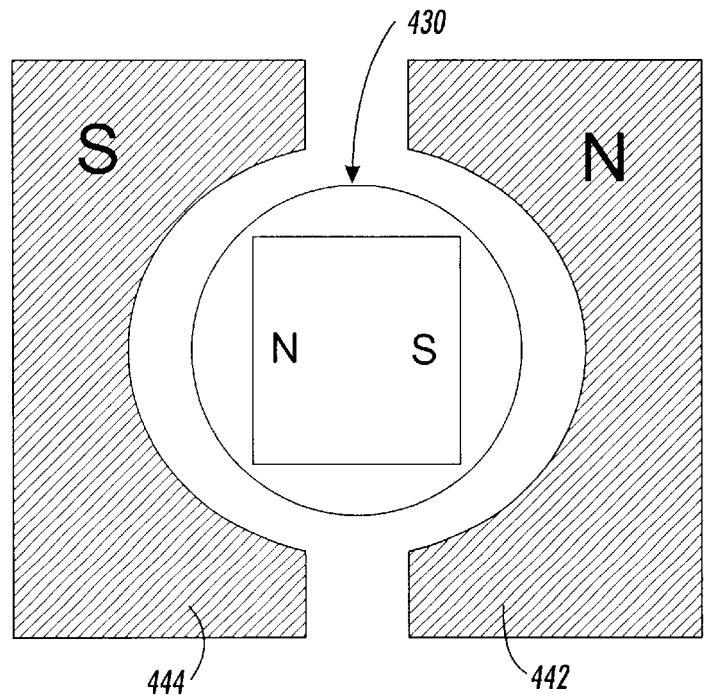
FIG. 42 depicts a further method of fabricating rotatable elements consistent with a first embodiment of the present invention and inducing magnetization in a filament.

An additional step necessary for rotatable elements of the present invention is to subject them to an external field in order to set the rotatable elements residual magnetism. FIG. 42 depicts a manner of subjecting filament 430 to an external field consistent with the first embodiment of rotatable element. Accordingly, filament 430 may be surrounding by first magnetic pole addressor 442 and second magnetic pole addressor 444 configured to subject one hemisphere of a cross section of filament 430 to one polarity and the second hemisphere of a cross section of filament 430 to the second polarity.

Figure 43:
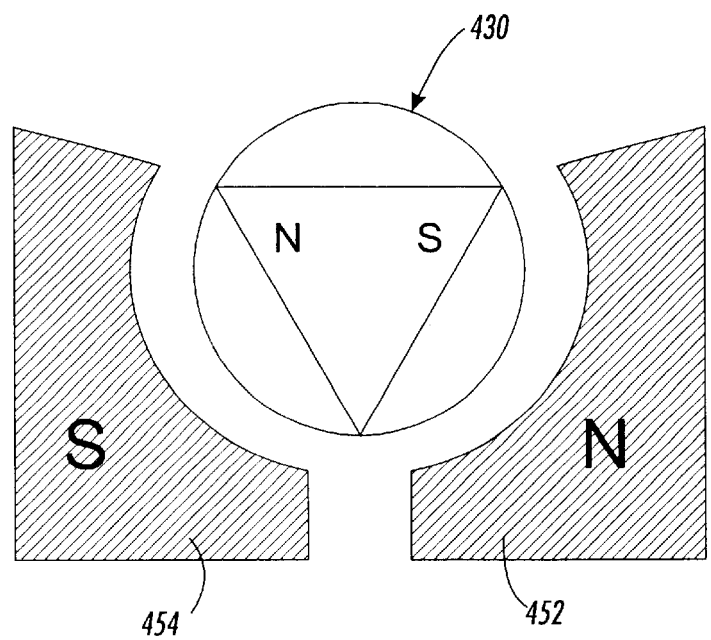
FIG. 43 depicts a further method of fabricating rotatable elements consistent with a second embodiment of the present invention and inducing magnetization in a filament.

Further still, FIG. 43 depicts a manner of subjecting filament 430 to an external field consistent with the second embodiment of rotatable element. Accordingly, filament 430 may be surrounding by third magnetic pole addressor 452 and fourth magnetic pole addressor 454 configured to subject one-third of the circumference of a cross section of filament 430 to one polarity and an adjacent one-third of the circumference of a cross section of filament 430 to the second polarity.

V.F. Coverage of Rotatable Elements of the Present Invention

Figure 44:
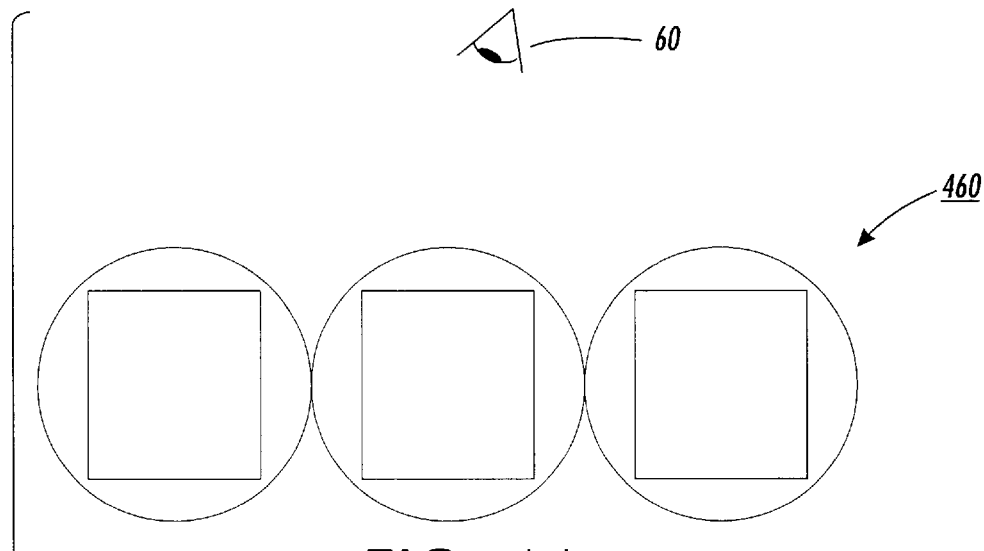
FIG. 44 depicts a row of rotatable elements consistent with a first embodiment of the present invention and indicating exemplary coverage.
Figure 45:
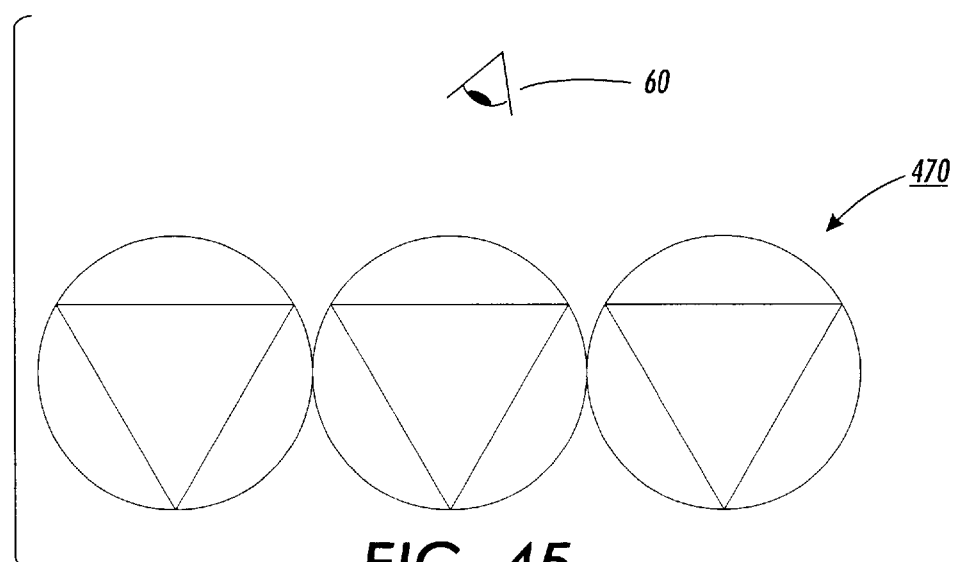
FIG. 45 depicts a row of rotatable elements consistent with a second embodiment of the present invention and indicating exemplary coverage.
Figure 46:
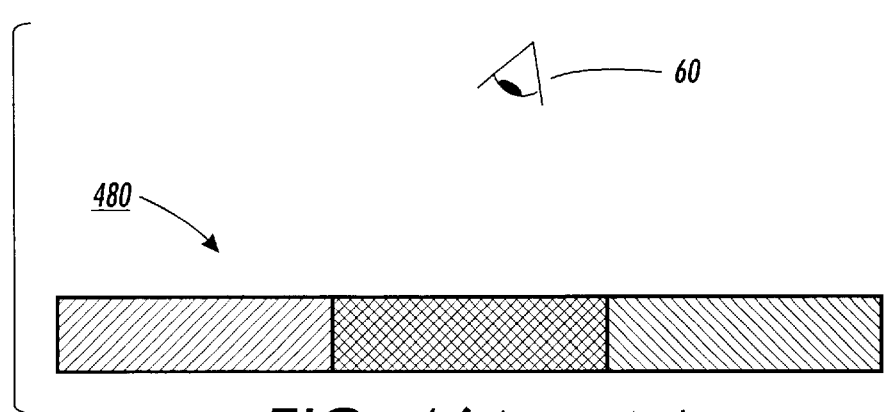
FIG. 46 depicts a conventional pixel of the prior art indicating exemplary coverage.

FIGS. 44–46 depict the relative coverage of closely packed rotatable elements of the present invention with conventional pixels of the prior art. From a geometrical analysis, the ratio of one side of a square that is circumscribed with a circle with the diameter of the circle is $1/\sqrt{2}$ representing approximately 70% coverage, as depicted in FIG. 44. Similarly, the ratio of one side of an equilateral triangle that is circumscribed with a circle with the diameter of the circle is $3/\sqrt(12)$ representing approximately 87% coverage, as depicted in FIG. 45. In comparison, a conventional display of the prior art is depicted in FIG. 46, where display area 480 comprises three pixels, which may be activated, alternatively, for example, as red, green, or blue. Accordingly, the coverage, where one of the three pixels may be activated, will be ⅓ or 33%.

Conclusion

Methods and apparatus consistent with the present invention can be used to assemble rotating element sheet material with dual vector field addressing. The foregoing description of an implementation of the invention has been presented for purposes of illustration and description. It is not exhaustive and does not limit the invention to the precise form disclosed. Modifications and variations are possible in light of the above teachings or may be acquired from practicing the invention. For example, some of the examples used the spectrum associated with visible light as the electromagnetic energy of interest. However, the use of any electromagnetic energy, including infrared, ultraviolet and x-rays as the electromagnetic energy of interest is consistent with the present invention. Still further, FIGS. 23–38 depict composite rotatable-elements with three or four aspects. However, the rotatable-elements may exhibit any number of aspects. Furthermore, the rotatable elements of the present invention were described as comprising aspect-transparent cladding. However, one skilled in the art should appreciate that the rotatable elements of the present invention may also be fabricated without aspect-transparent cladding. Accordingly, the rotatable elements may simply comprise a core with a suitable choice of coatings or material in order to present any number of aspects to a favorably situated observer. Accordingly, one skilled in the art should appreciate that by a suitable mixture of a first vector field and a second vector field, any of the multi aspect surfaces may be oriented towards a favorably situated observer. Accordingly, the invention is not limited to the above-described embodiments, but instead is defined by the appended claims in light of their full scope of equivalents.

What is claimed is:

1. Rotating element sheet material comprising:

a substrate;

enabling fluid; and a plurality of substantially cylindrical rotatable elements disposed in said substrate and in contact with said enabling fluid;

wherein one of said plurality of rotatable elements comprises:

a core configured to present a first aspect in a first orientation and a second aspect in a second orientation, where said first orientation and said second orientation are related by a rotational transformation about an axis of the core;

wherein said rotatable element in contact with said enabling fluid is configured to exhibit a first addressable dipole that couples with a first vector field and a second addressable dipole that couples with a second vector field;

wherein said rotatable element and said first addressable dipole are configured such that said rotatable element exhibits said first aspect in said first vector field oriented in a first direction substantially perpendicular to said axis; and wherein said rotatable element and said second addressable dipole are further configured such that said rotatable element exhibits said second aspect in said second vector field oriented in said first direction.

2. The rotating element sheet material of claim 1,
where said rotatable element further comprises:
aspect-transparent cladding configured to coat said core.

3. The rotating element sheet material of claim 1,
where said first vector field is an electric field; and
where said second vector field is a magnetic field.

4. The rotating element sheet material of claim 3,
where said core comprises ferromagnetic material.

5. The rotating element sheet material of claim 3,
where said core is further configured to exhibit a third aspect in a third orientation.

6. The rotating element sheet material of claim 5,
where said core is further configured to exhibit a fourth aspect in a fourth orientation.

7. The rotating element sheet material of claim 3, further comprising:
a controller;
a first overlay comprising a plurality of first electrodes; and
a second overlay comprising a plurality of second electrodes and a plurality of current loops;
where said substrate is between said first overlay and said second overlay;
where said controller is configured to cause a difference of electric potential energy in said first direction between at least one of said plurality of first electrodes and at least one of said plurality of second electrodes; and
where said controller is further configured to introduce a current in at least one of the plurality of current loops in a substantially perpendicular direction to said first direction.

8. The rotating element sheet material of claim 3,
where said first aspect is a first response to incident electromagnetic waves in the range of visible wavelengths; and
where said second aspect is a second response to incident electromagnetic waves in the range of visible wavelengths.

9. Rotating element sheet material comprising:
a substrate;
enabling fluid; and
a plurality of rotatable elements disposed in said substrate and in contact with said enabling fluid;
wherein one of said plurality of rotatable elements comprises:
a core configured to present a first aspect in a first orientation and a second aspect in a second orientation, where said first orientation and said second orientation are related by a rotational transformation about an axis of the core;
wherein said rotatable element in contact with said enabling fluid is configured to exhibit a first addressable dipole that couples with an electric field and a second addressable dipole that couples with a magnetic field;

wherein said rotatable element and said first addressable dipole are configured such that said rotatable element exhibits said first aspect in said electric field oriented in a first direction substantially perpendicular to said axis; and
wherein said rotatable element and said second addressable dipole are further configured such that said rotatable element exhibits said second aspect in said magnetic field oriented in said first direction;
where said first aspect is a first response to incident electromagnetic waves in the range of visible wavelengths; and
where said second aspect is a second response to incident electromagnetic waves in the range of visible wavelengths.

10. A method of addressing rotatable element sheet material comprising:
providing rotating element sheet material;
where the rotating element sheet material comprises:
a substrate;
enabling fluid; and
a plurality of substantially cylindrical rotatable elements disposed in said substrate and in contact with said enabling fluid;
wherein one of said plurality of rotatable elements comprises:
a core configured to present a first aspect in a first orientation and a second aspect in a second orientation, where said first orientation and said second orientation are related by a rotational transformation about an axis of the core;
wherein said rotatable element in contact with said enabling fluid is configured to exhibit a first addressable dipole that couples with a first vector field and a second addressable dipole that couples to a second vector field;
wherein said rotatable element and said first addressable dipole are configured such that said rotatable element exhibits said first aspect in said first vector field oriented in a first direction substantially perpendicular to said axis; and
wherein said rotatable element and said second addressable dipole are further configured such that said rotatable element exhibits said second aspect in said second vector field oriented in said first direction; and
introducing said first vector field in said first direction.

11. The method of addressing rotating element sheet material of claim 10, further comprising:
introducing said second vector field in said first direction.

12. The method of addressing rotating element sheet material of claim 10,
where said first vector field is an electric field.

13. The method of addressing rotating element sheet material of claim 10,
where said second vector field is a magnetic field.

14. The method of addressing rotating element sheet material of claim 10,
where said first aspect is a first response to incident electromagnetic waves in the range of visible wavelengths; and
where said second aspect is a second response to incident electromagnetic waves in the range of visible wavelengths.

15. A method of addressing rotating element sheet material comprising:

providing rotating element sheet material;

where the rotating element sheet material comprises:
  a substrate;
  enabling fluid; and
  a plurality of rotatable elements disposed in said substrate and in contact with said enabling fluid:
  wherein one of said plurality of rotatable elements comprises:
    a core configured to present a first aspect in a first orientation and a second aspect in a second orientation, where said first orientation and said second orientation are related by a rotational transformation about an axis of the core;
    wherein said rotatable element in contact with said enabling fluid is configured to exhibit a first addressable dipole that couples with a first vector field and a second addressable dipole that couples to a second vector field;
    wherein said rotatable element and said first addressable dipole are configured such that said rotatable element exhibits said first aspect in said first vector field oriented in a first direction substantially perpendicular to said axis; and
    wherein said rotatable element and said second addressable dipole are further configured such that said rotatable element exhibits said second aspect in said second vector field oriented in said first direction; and
  introducing said first vector field in said first direction;

where said first aspect is a first response to incident electromagnetic waves in the range of visible wavelengths; and where said second aspect is a second response to incident electromagnetic waves in the range of visible wavelengths.

16. A method of fabricating rotating element sheet material comprising:

providing a plurality of rotatable elements dispersed in a substrate and in contact with an enabling fluid;

wherein one of said plurality of rotatable elements comprises:
  a core configured to present a first aspect in a first orientation and a second aspect in a second orientation, where said first orientation and said second orientation are related by a rotational transformation about an axis of the core;
  wherein said rotatable element in contact with said enabling fluid is configured to exhibit a first addressable dipole that couples with a first vector field and a second dipole that couples with a second vector field;
  wherein said rotatable element and said first addressable dipole are configured such that said rotatable element exhibits said first aspect in said first vector field oriented in a first direction substantially perpendicular to said axis; and
  wherein said rotatable element and said second dipole are further configured such that said second dipole is parallel to said axis; and
  simultaneously providing said first vector field oriented in said first direction and said second vector field in a second direction substantially perpendicular to both said axis and said first direction;
  wherein said second vector field is configured to couple with said second dipole so as to reorient said second dipole such that said second dipole is in said second direction substantially perpendicular to both said first direction and said axis.

17. The method of claim 16, where said second vector field is a magnetic field.

18. The method of claim 17, where said core comprises ferromagnetic material.

* * * * *

UNITED STATES PATENT AND TRADEMARK OFFICE
CERTIFICATE OF CORRECTION

PATENT NO. : 6,690,350 B2
DATED : February 10, 2004
INVENTOR(S) : Nicholas K. Sheridon It is certified that error appears in the above-identified patent and that said Letters Patent is hereby corrected as shown below:

<u>Title page,</u>
Item [*] Notice, should read -- Subject to any disclaimer, the term of this patent is extended or adjusted under 35 U.S.C. 154(b) by 159 days. --

Signed and Sealed this

Nineteenth Day of July, 2005

JON W. DUDAS
*Director of the United States Patent and Trademark Office*